United States Patent
Li et al.

(10) Patent No.: US 12,174,485 B2
(45) Date of Patent: Dec. 24, 2024

(54) DISPLAY MODULE AND DISPLAY APPARATUS

(71) Applicants: Beijing BOE Display Technology Co., Ltd., Beijing (CN); BOE TECHNOLOGY GROUP CO., LTD., Beijing (CN)

(72) Inventors: Huiyan Li, Beijing (CN); Shixin Geng, Beijing (CN); Yu Zhang, Beijing (CN); Miao Liu, Beijing (CN); Fuxue Liang, Beijing (CN); Xuefei Qin, Beijing (CN); Lulu Wang, Beijing (CN); Zheng Wang, Beijing (CN); Tianyang Han, Beijing (CN)

(73) Assignees: Beijing BOE Display Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/017,983

(22) PCT Filed: Apr. 20, 2022

(86) PCT No.: PCT/CN2022/088022
§ 371 (c)(1),
(2) Date: Jan. 25, 2023

(87) PCT Pub. No.: WO2023/201595
PCT Pub. Date: Oct. 26, 2023

(65) Prior Publication Data
US 2024/0272474 A1    Aug. 15, 2024

(51) Int. Cl.
*G02F 1/00*    (2006.01)
*F21V 8/00*    (2006.01)
(Continued)

(52) U.S. Cl.
CPC ..... *G02F 1/133603* (2013.01); *G02B 6/0055* (2013.01); *G02F 1/133314* (2021.01);
(Continued)

(58) Field of Classification Search
CPC ........................ G02F 1/133317; G02B 6/0055
See application file for complete search history.

(56) References Cited

U.S. PATENT DOCUMENTS 10,168,573 B2 *   1/2019   Cao ................... G02F 1/133608
RE47,541 E        7/2019   Kim et al.
(Continued)

FOREIGN PATENT DOCUMENTS

| CN | 1598668 A | 3/2005 |
| CN | 1815333 A | 8/2006 |

(Continued)

*Primary Examiner* — Gerald J Sufleta, II
(74) *Attorney, Agent, or Firm* — HOUTTEMAN LAW LLC

(57) ABSTRACT

A display module and a display apparatus are provided. In the display module, a backlight assembly includes a light source assembly and an optical film layer. Light emitted by the light source assembly enters a display panel through the optical film layer; and through grooves are on at least one long side and at least one short side of the optical film layer and penetrate through the optical film layer in a direction perpendicular to a plane of a light outgoing surface of the display panel. The display module further includes an intermediate frame including an intermediate frame body surrounding the backlight assembly and a first extension between the display panel and the optical film layer; and second protrusions on a surface opposite to the through grooves and correspondingly in the through grooves.

20 Claims, 10 Drawing Sheets

(51) Int. Cl.
*G02F 1/1333* (2006.01)
*G02F 1/1335* (2006.01)
*G02F 1/13357* (2006.01)
(52) U.S. Cl.
CPC .. *G02F 1/133317* (2021.01); *G02F 1/133605* (2013.01); *G02F 1/133608* (2013.01); *G02F 1/133612* (2021.01)

(56) References Cited

U.S. PATENT DOCUMENTS

| | | | |
|---|---|---|---|
| 2011/0157512 A1 | 6/2011 | Mishima | |
| 2013/0235295 A1* | 9/2013 | Tang | G02F 1/133608 |
| | | | 362/97.2 |
| 2016/0291385 A1* | 10/2016 | Yoshikawa | G02F 1/133504 |
| 2018/0231709 A1* | 8/2018 | Chen | G02F 1/133615 |
| 2022/0171120 A1* | 6/2022 | Cai | G02F 1/133608 |
| 2024/0036396 A1* | 2/2024 | Ren | G02B 6/0055 |

FOREIGN PATENT DOCUMENTS

| | | |
|---|---|---|
| CN | 101178503 A | 5/2008 |
| CN | 201149633 Y | 11/2008 |
| CN | 102859424 A | 1/2013 |
| CN | 202835045 U | 3/2013 |
| CN | 203052546 U | 7/2013 |
| CN | 102748668 B | 6/2014 |
| CN | 105223711 A | 1/2016 |
| CN | 207424289 U | 5/2018 |
| CN | 208027045 U | 10/2018 |
| CN | 110007517 A | 7/2019 |
| CN | 210514882 U | 5/2020 |
| CN | 113589585 A | 11/2021 |
| JP | UP2010261978 A | 11/2010 |
| KR | 20010036079 A | 5/2001 |
| KR | 20080058795 A | 6/2008 |

* cited by examiner

DISPLAY MODULE AND DISPLAY APPARATUS

TECHNICAL FIELD

The present disclosure relates to the field of display technology, and in particular to a display module and a display apparatus.

BACKGROUND

A liquid crystal bar (bar-shaped) screen is a novel display medium which gradually enters people's life and work recently. The liquid crystal bar screen has a wider and wider application, and has been rapidly developed in the intelligent transportation system field such as public transportation, subway and the like. Especially, a bar screen with a super-long size may be used for scenes such as advertisement serving, a display for traffic guiding of the public transportation or the like, and is compatible with the use in a landscape mode and a portrait mode, thereby bringing more direct visual convenience for the masses.

However, for a display screen with a super-long size (especially a bar screen), in a case of being compatible with the use in a landscape mode and a portrait mode, it is difficult to ensure that the misalignment problem does not appear in the optical film layer. The optical film layer is limited by a limit structure in the prior art, but the existing limit structure may lead to a too wide frame of the display module, which cannot satisfy a narrow frame requirement.

SUMMARY

The present disclosure aims to solve at least one of technical problems in the prior art, and provides a display module and a display apparatus, which may ensure that the misalignment problem does not appear in the optical film layer and satisfy a narrow frame requirement while a display screen with a super-long size (especially a bar screen, a length of the bar screen is more than 600 mm, for example) is compatible with the use in a landscape mode and a portrait mode.

In order to achieve the above object, an embodiment of the present disclosure provides a display module, including a display panel and a backlight assembly on a side away from a light outgoing surface of the display panel, wherein the backlight assembly includes a light source assembly and an optical film layer, and light emitted by the light source assembly enters the display panel through the optical film layer;

through grooves are on at least one long side and at least one short side of the optical film layer and penetrate through the optical film in a direction perpendicular to a plane where the light outgoing surface of the display panel is located; and the display module further includes an intermediate frame, wherein the intermediate frame includes an intermediate frame body surrounding the backlight assembly and a first extension between the display panel and the optical film layer; the intermediate frame further includes second protrusions on a surface opposite to the through grooves, and correspondingly in the through grooves.

In an embodiment, a plurality of through grooves are on the at least one long side of the optical film layer, and a middlemost through groove of all the through grooves on the at least one long side of the optical film layer is offset from a symmetry plane of the optical film layer parallel to the at least one short side of the optical film layer and perpendicular to the plane where the light outgoing surface of the display panel is located; the remaining through grooves are symmetrically distributed with respect to the symmetry plane of the optical film layer parallel to the at least one short side of the optical film layer and perpendicular to the plane where the light outgoing surface of the display panel is located; and a plurality of through grooves are on the at least one short edge of the optical film layers, and are symmetrically distributed with respect to a symmetry plane of the optical film layer parallel to the at least one long side of the optical film layer and perpendicular to the plane where the light outgoing surface of the display panel is located.

In an embodiment, first protrusions are provided on the at least one long side and the at least one short side of the optical film layer; each first protrusion extends toward an outside of an edge of the optical film layer along a direction parallel to a plane where a light incident surface of the optical film layer is located; each through groove is at a position away from a farthest end of the corresponding first protrusion, and the farthest end is a farthest end of the corresponding first protrusion extending toward the outside of the edge of the optical film layer.

In an embodiment, any two adjacent first protrusions on the at least one long side of the optical film layer have a first distance therebetween, and the first protrusion closest to the at least one short side of the optical film layer and the at least one short side of the optical film layer has a second distance therebetween; and the first distance is greater than or equal to 160 mm and less than or equal to 300 mm; the second distance is greater than or equal to 50 mm and less than or equal to 150 mm.

In an embodiment, any two adjacent first protrusions on the at least one short side of the optical film layer have a third distance therebetween, and the first protrusion closest to the at least one long side of the optical film layer and the at least one long side of the optical film layer has a fourth distance therebetween; and the third distance is greater than or equal to 50 mm and less than or equal to 150 mm; the fourth distance is greater than or equal to 30 mm and less than or equal to 70 mm.

In an embodiment, the light source assembly further includes a light guide plate and a reflective sheet, which are on a side of the optical film layer away from the display panel, and sequentially arranged along a direction away from the optical film layer; the light source assembly further includes a lateral backlight source opposite to the light guide plate; and a third protrusion is at a position of the light guide plate corresponding to the first protrusion on the at least one long side and/or the at least one short side of the optical film layer, and an orthographic projection of the third protrusion on a plane parallel to the plane where the light outgoing surface of the display panel is located partially overlaps an orthographic projection of the first protrusion on the plane parallel to the plane where the light outgoing surface of the display panel is located.

In an embodiment, an overlapping area of the orthographic projection of the third protrusion on the plane where the light outgoing surface of the display panel is located and an orthographic projection of the through groove on the plane where the light outgoing surface of the display panel is located, is greater than or equal to one half of, an area of the orthographic projection of the through groove on the plane where the light outgoing surface is located.

In an embodiment, a first reserved expansion distance is between the third protrusion and a component opposite to the third protrusion in an extending direction of the light guide plate; a second reserved expansion distance is between a remaining portion of an side edge of the light guide plate other than the third protrusion and a component opposite to the remaining portion in an extending direction of the light guide plate.

In an embodiment, the display module further includes a backplane, the backplane includes a backplane body on a side of the backlight assembly away from the display panel, and a backplane side edge surrounding the backlight assembly;

the intermediate frame further includes an intermediate frame side edge and a retaining wall on a side of the backplane body close to the display panel in a direction perpendicular to the light outgoing surface of the display panel; in a direction parallel to the light outgoing surface of the display panel, the retaining wall is on a side of the backplane side edge close to the optical film layer, and the backplane side edge is between the intermediate frame side edge and the retaining wall;

a distance between the retaining wall and the remaining portion of the side edge of the light guide plate other than the third protrusion includes the second reserved expansion distance; and an avoiding through groove is on a surface of the retaining wall opposite to the light guide plate and at a position corresponding to the third protrusion; a distance between the backplane side edge and the third protrusion at the avoiding through groove includes the first reserved expansion distance.

In an embodiment, the light source assembly further includes a light guide plate and a reflective sheet, which are on a side of the optical film layer away from the display panel, and sequentially arranged along a direction away from the optical film layer; the light source assembly further includes a lateral backlight source opposite to the light guide plate;

the through grooves are only on one long edge and one short edge of the optical film layer;

no through groove is on the other long edge of the optical film layer corresponding to the lateral backlight source; and an outline of a display region of the display panel is rectangular.

In an embodiment, the display module further includes a backplane, the backplane includes a backplane body on a side of the backlight assembly away from the display panel, and a backplane side edge surrounding the backlight assembly; the light source assembly further includes a light guide plate and a reflective sheet, which are on a side of the optical film layer away from the display panel, and sequentially arranged along a direction away from the optical film layer; the light source assembly further includes a lateral backlight source opposite to the light guide plate; wherein at least one support pillar is on a surface of the backplane side edge, which is away from the lateral backlight source, opposite to the light guide plate; the at least one support pillar extends toward the light guide plate, the light guide plate includes at least one groove corresponding to the at least one support pillar, and each of the at least one support pillar extends into a corresponding groove of the at least one groove; and a surface of the light guide plate toward the at least one support pillar includes a fourth protrusion extending in a direction parallel to a plane where the light guide plate is located, and the at least one groove is on the fourth protrusion.

In an embodiment, the at least one support pillar includes two support pillars symmetrically distributed with respect to a symmetry plane of the backplane side edge with the two support pillars perpendicular to the plane where the light outgoing surface of the display panel is located.

In an embodiment, the at least one support pillar and the optical film layer partially overlap with each other in a direction parallel to the plane where the light outgoing surface of the display panel is located; the at least one support pillar and the optical film layer are spaced apart from each other in a direction perpendicular to the plane where the light outgoing surface of the display panel is located.

In an embodiment, at least one elastic support member is on a surface of the backplane side edge, which is away from the lateral backlight source, opposite to the light guide plate, and is used for supporting the light guide plate; and the lateral backlight source includes a first printed circuit board and an LED light bar arranged on the first printed circuit board; and at least one bearing member is on a surface of the first printed circuit board opposite to the light guide plate and for supporting the light guide plate.

In an embodiment, the at least one elastic support member includes two first elastic support members and one second elastic support member, wherein the two first elastic support members are in a compressed state, and a gap exists between the second elastic support member and the light guide plate; and the two second elastic support members are close to two edge positions of a long edge of the light guide plate, respectively; and the first elastic support member is between the two first elastic support members.

In an embodiment, a protective layer is on a surface of the first elastic support member opposite to the light guide plate and for reducing a friction coefficient of a main material of the first elastic support member.

In an embodiment, the display module further includes a backplane, the backplane includes a backplane body on a side of the backlight assembly away from the display panel, the display module further includes at least one second printed circuit board electrically connected to the display panel through flat cables and for transmitting display signals to the display panel, wherein, each of at least one elastic mounting member is between one of the at least one second printed circuit board and a surface of the backplane body away from the backlight assembly and for limiting the second printed circuit board on the surface of the backplane body away from the backlight assembly; and the at least one elastic mounting member includes an elastic mounting member body between the backplane body and each second printed circuit board, and two limiting bending portions connected to the elastic mounting member body; and a main portion of each of the two limiting bending portions extends in a direction away from the backplane body; limiting bending members are respectively at ends of the two limiting bending portions away from the elastic mounting member body and opposite to each other, and the elastic mounting member body, the two limiting bending portions and the two limiting bending members are arranged to half-surround the second printed circuit board, so as to limit the second printed circuit board.

In an embodiment, a first gap is between each limiting bending portion and the second printed circuit board in a direction perpendicular to an extending direction of the second printed circuit board; a second gap is between each limiting bending member and the second printed circuit board in the direction perpendicular to the plane where the light outgoing surface of the display panel is located;

a side of the second printed circuit board close to the backplane body includes at least one grounding region, and an conductive flexible member is between the at least one grounding region and a surface of the backplane body away from the backlight assembly and for electrically connecting the at least one grounding region and the backplane body together, and the conductive flexible member is adhesively connected to the at least one grounding region and the backplane body.

In an embodiment, the at least one second printed circuit board includes a plurality of second printed circuit boards, at least one pair of the second printed circuit boards is electrically connected to each other through a flexible circuit board, which is movably fixed to a side of the backplane body away from the backlight assembly.

In an embodiment, a fixing tape is on the surface of the backplane body away from the backlight assembly at a position corresponding to the flexible circuit board, and includes an adhesive-free portion, a first adhesive portion and two second adhesive portions, wherein at least a portion of the flexible circuit board is between the backplane body and the adhesive-free portion;

the first adhesive portion and the two second adhesive portions are respectively on three sides of the adhesive-free portion and are connected to the adhesive-free portion to form a one-piece structure; the two second adhesive portions are respectively at two sides of the adhesive-free portion; and a first avoiding gap is between the first adhesive portion and the flexible circuit board; a second avoiding gap is between each second adhesive portion and the flexible circuit board.

In an embodiment, a surface profile of the backplane body parallel to the light outgoing surface of the display panel is rectangular; each second printed circuit board is strip-shaped and extends along a long side of the rectangle; wherein a reinforcing rib is on a surface of the backplane body away from the backlight assembly and on a side of the second printed circuit board away from a long edge of the backplane body, and is recessed towards a direction close to the display panel and extends along a direction parallel to the long edge of the backplane body; a part of an orthographic projection of the flexible circuit board on the backplane body is in a recessed portion of the reinforcing rib, at least one part of the flexible circuit board is between the backplane body and the adhesive-free portion; and the first adhesive portion is on a side of the recessed portion of the reinforcing rib away from the long side of the backboard body; the two second adhesive portions are on a side of the recessed portion of the reinforcing rib close to the long side of the backplane body.

In an embodiment, a display region of the display panel has a diagonal size of greater than or equal to 47.1 inches and a length-width ratio of greater than or equal to 3.2.

As another technical solution, an embodiment of the present disclosure further provides a display apparatus, including the above display module of the embodiment of the present disclosure, wherein the display module is a bar display module.

DETAIL DESCRIPTION OF EMBODIMENTS

Figure 1:
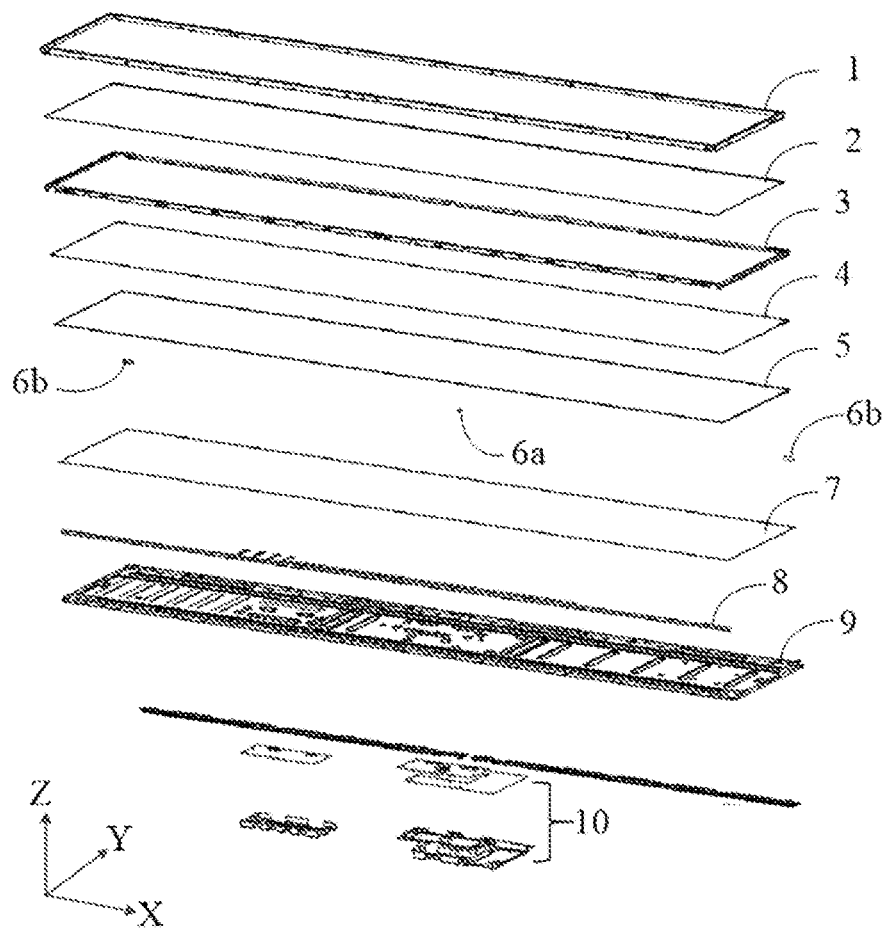
FIG. 1 is an exploded view of a structure of a display module according to an embodiment of the present disclosure.

In order to make the objects, technical solutions and advantages of the present disclosure more apparent, the present disclosure will be described in further detail with reference to the accompanying drawings. Obviously, the described embodiments are a part, not all, of embodiments in the present disclosure. All other embodiments, which may be obtained by a person skilled in the art without any creative effort based on the embodiments in the present disclosure, belong to the protection scope of the present disclosure.

Shapes and sizes of components in the drawings are not to scale, but are merely intended to facilitate an understanding of the contents of the embodiments of the present disclosure.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

The disclosed embodiments are not limited to the embodiments shown in the drawings, but include modifications of configurations formed based on a manufacturing process. Thus, areas illustrated in the drawings have schematic properties, and shapes of the areas shown in the drawings illustrate specific shapes of the areas of elements, but are not intended to be limiting.

Referring to FIG. 1, a display module according to an embodiment of the present disclosure includes a frame 1, a display panel 2, an intermediate frame 3, a backlight assembly, a backplane 9, and a circuit board assembly 10 (including a constant current board and a protection cover thereof, and a timing controller and a protection cover thereof). The backlight assembly is arranged on a side away from a light outgoing surface of the display panel 2, and includes a light source assembly and an optical film layer (including at least one functional film) 4, wherein light emitted by the light source assembly enters the display panel 2 through the optical film layer; specifically, the backlight assembly may be a lateral backlight assembly or a direct backlight assembly. When the backlight assembly 8 is a lateral backlight assembly, the light source assembly further includes a light guide plate 5 and a reflective sheet 7, which are on a side of the optical film layer 4 away from the display panel 2, and sequentially arranged along a direction away from the optical film layer 4. In addition, the light source assembly may further include a lateral backlight source 8 disposed opposite to the light guide plate 5. The term "opposite to" here means that the lateral backlight source 8 is arranged opposite to a light incident surface of the light guide plate 5 perpendicular to a plane where the light outgoing surface of the display panel 2 is located. The optical film layer 4 may, for example, has a light-homogenizing function. In practical applications, the optical film layer 4 may include, for example, a plurality of optical films such as a lower diffusion film for diffusing light, a prism film for improving the brightness of light, or the like; and in an embodiment, a diffusion film or other functional films may be added.

Figure 2:
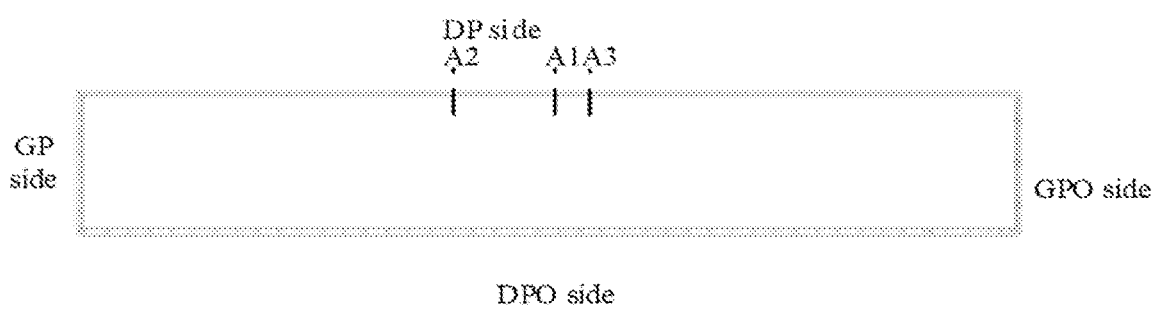
FIG. 2 is a front view of a display module placed in a landscape mode according to an embodiment of the present disclosure.
Figure 3:
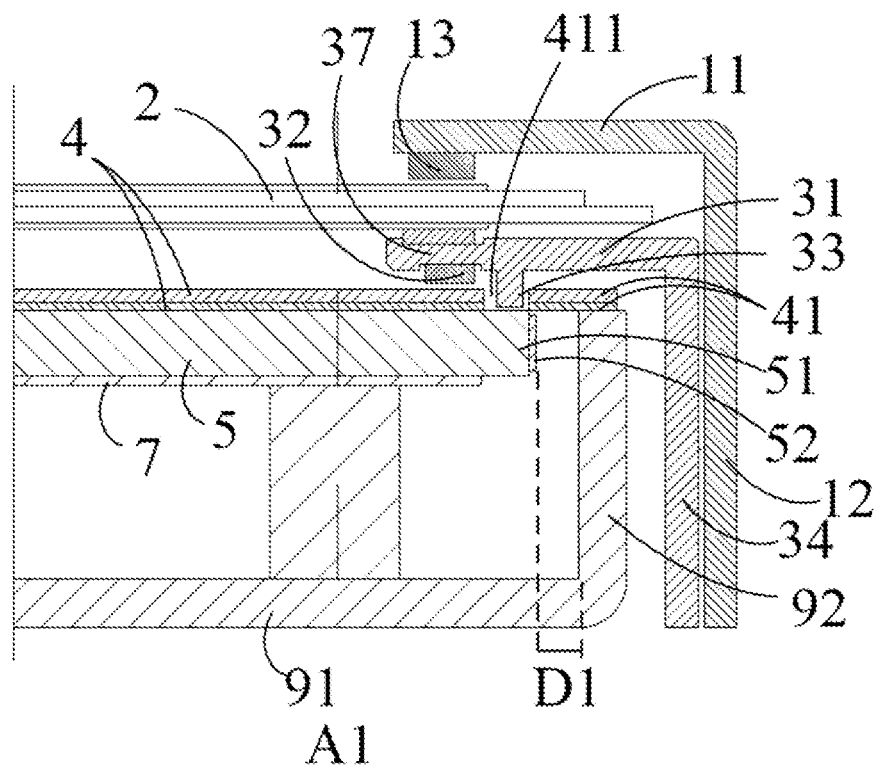
FIG. 3 is a cross-sectional view taken along a line A1 of FIG. 2.
Figure 4:
FIG. 4 is a partial view of a structure of an optical film layer according to an embodiment of the present disclosure.

Referring to FIGS. 2 to 4, through grooves 411 are provided on at least one long side and at least one short side of the optical film layer 4 and penetrate through the optical film in a direction perpendicular to the plane where the light outgoing surface of the display panel is located. The through groove 411 may limit the optical film layer 4 in two directions together with other structures (such as an intermediate frame) of the display module, so that it may ensure that the misalignment problem does not appear in the optical film layer 4 while the display module is compatible with the use in a landscape mode and a portrait mode.

In an embodiment, first protrusions 41 are provided on the at least one long side and the at least one short side of the optical film layer 4; in an embodiment, each first protrusion 41 extends toward the outside of an edge of the optical film layer 4 along a direction parallel to a plane where a light incident surface of the optical film layer 4 is located. Alternatively, each through groove 411 is provided at a position away from a farthest end of a corresponding first protrusion, and the farthest end is a farthest end of the corresponding first protrusion extending toward the outside of the edge of the optical film layer 4. In practical applications, each through groove 411 may be partially or entirely located inside the corresponding first protrusion 41, or may be adjacent to the corresponding first protrusion 41. For example, the first protrusion 41 is provided with the through groove 411 that penetrates through the first protrusion 41 in a direction perpendicular to the plane where the light outgoing surface of the display panel 2 is located. The first protrusion 41 and the through groove 411 are matched with each other, which ensures a stable force applied on the optical film layer 4 when the display module is in the landscape mode or the portrait mode, and may reduce a size of the optical film layer 4 at its edge region, and thus, reduce a size of the frame of the display module. In some alternative embodiments, only the through grooves 411 may be disposed on the at least one long side or the at least one short side of the optical film layer 4 without the first protrusions 41, and the through grooves 411 may be disposed directly on the edge of the optical film layer 4.

In some specific embodiments, the display module further includes an intermediate frame 3, wherein the intermediate frame 3 includes an intermediate frame body 31 surrounding the backlight assembly; the intermediate frame 3 further includes a second protrusion 33 disposed on a surface opposite to the through groove 411, and the second protrusion 33 is correspondingly disposed in the through groove. Specifically, the surface opposite to the through groove 411 may be a surface of a portion of the intermediate frame body 31, for example, a surface of a portion of the intermediate frame body 31 extending along a direction parallel to the plane where the light outgoing surface of the display panel 2 is located and facing the through groove 411.

In some specific embodiments, the display module further includes a first extension 37 which is located between the display panel 2 and the optical film layer 4, and is used for carrying (supporting) the display panel 2 and is connected to the intermediate frame body 31. Specifically, the first extension 37 and the intermediate frame body 31 may have a one-piece structure.

In some specific embodiments, the second protrusion 33 is located on a side of the first extension 37 opposite to the through groove 411, i.e., the surface opposite to the through groove 411 may be the surface of the first extension 37 facing the through groove 411.

In some specific embodiments, the second protrusion 33, the first extension 37 and the intermediate frame body 31 may have a one-piece structure.

Through a structure similar to a "hanger" formed by the through groove 411 and the second protrusion 33 matched with each other, when the display module is used in the landscape mode, the optical film layer 4 may be the limited by using the "hanger" structure corresponding to one long side of the optical film layer 4 (which is located on a sky side (namely, a DP side in FIG. 2) of the display module); in a similar way, when the display module is used in the portrait mode, the optical film layer 4 may be the limited by using the "hanger" structure corresponding to one short side of the optical film layer 4 (which is located on the sky side of the display module). In this way, it may ensure that the misalignment problem does not appear in the optical film layer 4 and satisfy a narrow frame requirement while the display module is compatible with the use in the landscape mode and the portrait mode. Especially, for the display screen with the super-long size (especially the bar screen, a length of the bar screen is more than 600 mm, for example), it may ensure that the optical film layer 4 may not fall off from the second protrusion 33 due to factors such as vibrations, action of gravity when the display module is applied to an application scene with high mechanical properties such as public transportation, subway, sliding door or the like. In addition, through the structure that the second protrusion 33 extends into the through groove 411, a matching structure does not need to be additionally arranged on an side edge of the optical film layer 4, and a thermal expansion space does not need to be reserved for the matching structure, so that a space on the side edge of the optical film layer 4 is greatly saved, and a design for a narrow frame of the display screen with the super-long size (especially the bar screen, a length of the bar screen is more than 600 mm, for example, the length of 2 m) may be further realized. For example, compared with the conventional display module with the super-long size, a long side of a profile is 2187.8 mm and a short side is 12.9 mm, the display module provided by the present application has a long side of 2171.08 mm, which is similar to the conventional display module, and further, with the help of the "hanger" structure, the display module has a short side of only 11.3 mm, which is optimized by 14.2% than the related art, so that the requirement of the narrow frame may be met.

Specifically, a profile of the light outgoing surface of the display panel is rectangular or approximately rectangular; an orthographic projection of an outer profile of the display module on a plane where the light outgoing surface of the display panel is located may be rectangular or approximately rectangular; orthographic projections of an outer profile of the intermediate frame, an outer profile of the light guide plate and an outer profile of the optical film layer on the plane where the light outgoing surface of the display panel is located may be all rectangular or are all substantially rectangular. The rectangle may also include a rounded rectangle, i.e. at least one of the four corners of the rectangle is rounded.

In some alternative embodiments, for the single-sided lateral backlight source 8, that is, the through grooves 411 are only disposed on one long side and one short side of the optical film layer 4, and the through grooves 411 are not disposed on the other long side of the optical film layer 4 corresponding to the lateral backlight source 8, that is, the through grooves 411 are only disposed on the long side of the optical film layer 4 away from the lateral backlight source 8. In this way, as an example, a profile of a display region of the display panel 2 is a rectangle, when the display module is used in the landscape mode, the lateral backlight source 8 may be located on a ground side (i.e., a DPO side in FIG. 2) of the display module, and the through grooves 411 are located on the sky side (i.e., the DP side in FIG. 2) of the display module. The ground side (DPO side) refers to a side, facing the placing plane, of the display module when the display module is placed on the placing plane; the sky side (DP side) refers to a side of the display module away from the placing plane when the display module is placed on the placing plane. In addition, in the portrait mode, the through groove 411 on the short side may be located on the sky side of the display module.

The through grooves 411 are located on the sky side of the display module, the optical film layer 4 may be "hanged" on a corresponding second protrusion 33 by the through grooves 411 under the action of gravity, to limit the optical film layer 4. The lateral backlight source 8 is located on the ground side of the display module, because if the lateral backlight source 8 is positioned on the sky side of the display module, the light guide plate 5 may be shifted toward a direction away from the lateral backlight source 8 under the action of gravity, so as to adversely affect the display effect. However, the present disclosure is not limited to here. In actual applications, the first protrusions 41 may also be provided on the long side of the optical film layer 4 on a side where the lateral backlight source 8 is located.

Figure 5:
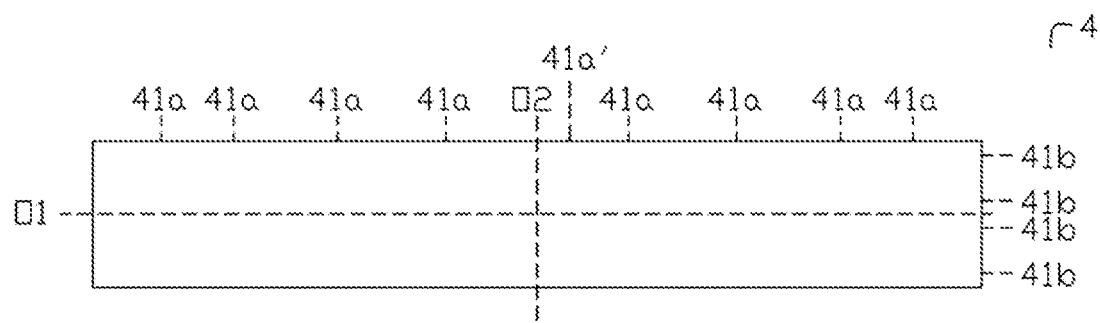
FIG. 5 is a schematic diagram illustrating a distribution of a plurality of first protrusions on a long side and a short side of an optical film layer, respectively, according to an embodiment of the present disclosure.

In some alternative embodiments, as shown in FIG. 5, the first protrusions 41a on the long side of the optical film layer 4 are multiple; and of all the first protrusions 41a on the long side of the optical film layer 4, the middlemost first protrusion 41 $a'$ is offset from a symmetry plane (i.e., offset from a central axis O2 in FIG. 5) of the optical film layer 4 parallel to the short side of the optical film layer 4 and perpendicular to the plane where the light outgoing surface of the display panel 2 is located; the remaining first protrusions 41a are symmetrically distributed with respect to the symmetry plane (i.e., offset from the central axis O2 in FIG. 5) of the optical film layer 4 parallel to the short side of the optical film layer 4 and perpendicular to the plane where the light outgoing surface of the display panel 2 is located. The first protrusions 41b on the short side of the optical film layer 4 are multiple and are symmetrically distributed with respect to the symmetry plane (i.e. offset from a central axis O1 in FIG. 5) of the optical film layer 4 parallel to the long side of the optical film layer 4 and perpendicular to the plane where the light outgoing surface of the display panel 2 is located. The middlemost first protrusion 41 $a'$ is offset, so that the fool-proofing of assembly may be achieved, that is, the occurrence of assembly errors may be avoided.

In some alternative embodiments, as shown in FIG. 5, any two adjacent first protrusions 41a on the long side of the optical film layer 4 have a first distance therebetween, and the first protrusion 41a closest to the short side of the optical film layer 4 and the short side of the optical film layer 4 has a second distance therebetween; the first distance is greater than or equal to 160 mm and less than or equal to 300 mm; the second distance is greater than or equal to 50 mm and less than or equal to 150 mm. By setting the first distance and the second distance within the above ranges, it is possible to ensure that when the optical film layer 4 thermally expands in the long side direction, the optical film layer 4 does not accumulate between adjacent first protrusions 41a and between the first protrusion 41a closest to the short side of the optical film layer 4 and the short side, which causes a wrinkle abnormality in a picture; and it is possible to avoid a problem that an overall strength of the intermediate frame 3 is reduced due to a great number of avoiding structures provided on the intermediate frame 3 for avoiding the first protrusions 41a because the first protrusions 41a are distributed too densely.

In some alternative embodiments, as shown in FIG. 5, any two adjacent first protrusions 41b on the short side of the optical film layer 4 have a third distance therebetween, and the first protrusion 41b closest to the long side of the optical film layer 4 and the long side of the optical film layer 4 has a fourth distance therebetween; the third distance is greater than or equal to 50 mm and less than or equal to 150 mm; the fourth distance is greater than or equal to 30 mm and less than or equal to 70 mm. By setting the third distance and the fourth distance in the above ranges, it is possible to ensure that when the display module is used in the portrait mode, the weight borne by the single first protrusion 41b may be reduced, so that it is possible to ensure that a plastic deformation of the single first protrusion 41b caused by the weight borne by the single first protrusion 41b does not exceed a limit strength for a plastic deformation of the optical film layer 4 under the high-temperature reliability condition, and an irreversible deformation of the single first protrusion 41b in a reliability test may be avoided, not adversely affecting the display effect.

Figure 6A:
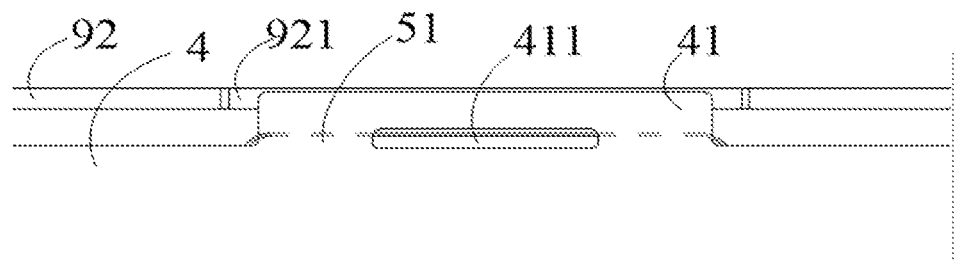
FIG. 6A is a schematic diagram illustrating a positional relationship among an optical film layer, a light guide plate, and a backplane at one of the first protrusions according to an embodiment of the present disclosure.

In some alternative embodiments, as shown in FIG. 3 and FIG. 6A, a third protrusion 51 is provided at a position of the light guide plate 5 corresponding to the first protrusions 41 on the long side and/or the short side of the optical film layer 4 (a contour line of the third protrusion 51 is shown by the dotted line in FIG. 6A), and an orthographic projection of the third protrusion 51 on a plane parallel to the plane where the light outgoing surface of the display panel 2 is located partially overlaps an orthographic projection of the first protrusion 41 on the plane parallel to the plane where the light outgoing surface of the display panel 2 is located, so that the first protrusions 41 may be limited, the first protrusions 41 may be prevented from jumping off from a gap between the light guide plate 5 and the intermediate frame 3 in the process of assembling, transporting and the like of the display module, particularly the display screen with the super-long size (especially the bar screen, a length of the bar screen is more than 600 mm, for example), in which process vibrations are possibly generated, the connection stability of the structure similar to the "hanger" formed by the first protrusions 41 and the through grooves 411 on the first protrusions is improved, and it is further ensured that the misalignment problem does not appear in the optical film layer 4.

In an embodiment, in order to improve the effectiveness of the limiting effect of the third protrusion 51, an overlapping area of the orthographic projection of the third protrusion 51 on the plane where the light outgoing surface of the display panel 2 is located and an orthographic projection of the through groove 411 on the plane where the light outgoing surface of the display panel 2 is located, is greater than or equal to one half of, an area of the orthographic projection of the through groove 411 on the plane where the light outgoing surface of the display panel 2 is located. Further, in an embodiment, as shown in FIG. 6A, the orthographic projection of the third protrusion 51 on the plane where the light outgoing surface of the display panel 2 is located completely or substantially completely covers the orthographic projection of the through groove 411 on the plane where the light outgoing surface of the display panel 2 is located.

Figure 6B:
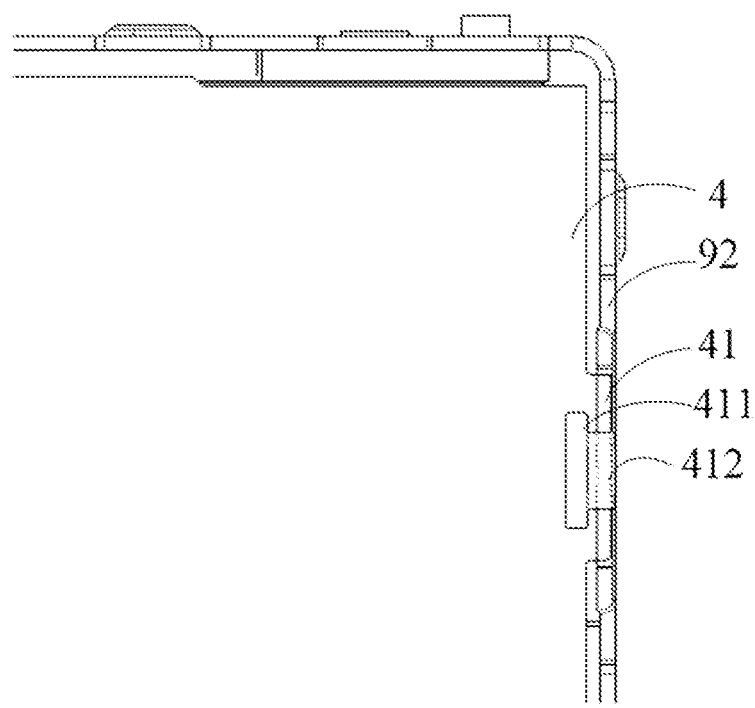
FIG. 6B is a schematic diagram of a structure of a through groove on a short side of an optical film layer according to an embodiment of the present disclosure.

In an embodiment, the third protrusion 51 is provided only at a position of the light guide plate 5 corresponding to the first protrusions 41 on the long side of the optical film layer 4; as shown in FIG. 6B, since the short side of the optical film layer 4 is shorter than the long side, the first protrusions 41 on the short side of the optical film layer 4 may be adhered to a backplane side edge 92 by an adhesive 412, which may also prevent the first protrusions 41 from jumping off from the gap between the light guide plate 5 and the intermediate frame 3; further, the orthographic projection of the through groove 411 on the short side of the optical film layer 4 on the plane where the light outgoing surface of the display panel 2 is located does not overlap an orthographic projection of the light guide plate 5 on the plane where the light outgoing surface of the display panel 2 is located, so that more expansion space may be reserved for the light guide plate 5. Further, in an embodiment, the third protrusion 51 may not be provided at the position of the light guide plate 5 corresponding to the first protrusion 41 on the short side of the optical film layer 4.

In an embodiment, as shown in FIGS. 6A and 6B, since a thermal expansion amount of an extended side of the optical film layer 4 is relatively larger, a width of the through groove 411 on the short side of the optical film layer 4 in a direction perpendicular to the short side of the optical film layer 4 is larger than the width of the through groove 411 on the long side of the optical film layer 4 in a direction perpendicular to the long side of the optical film layer 4, so as to prevent the optical film layer 4 from being extruded and thus deformed, and affecting the display effect of the display module.

In some alternative embodiments, as shown in FIG. 3, the frame 1 includes a frame body 11 located on a side of the display panel 2 away from the intermediate frame body 31 and extending along the plane parallel to the plane where the light outgoing surface of the display panel 2 is located, and a frame side edge 12 surrounding the intermediate frame 3. The intermediate frame 3 further includes an intermediate frame side edge 34 located on a side of the backplane side edge 92 away from the backlight assembly.

In some alternative embodiments, the light guide plate 5 may generate thermal expansion when heated to reach a certain temperature. If an expansion amount is too large, the normal use of the display module may be affected. In order that a storage temperature for the display module satisfies a wide temperature use condition, that is, the display module may be normally used in a wide range of space environment temperature, and the storage temperature refers to a temperature of a space environment where the display module is placed. In addition, since an operating temperature of the display module does not generally exceed the storage temperature, the expansion amount of the light guide plate 5 may be calculated by using the storage temperature. Of course, the expansion amount of the light guide plate 5 may be calculated by using the operating temperature. For example, the operating temperature is greater than and equal to −20° C. and lower than and equal to 60° C.; or the operating temperature is greater than and equal to −30° C. and lower than and equal to 80° C. In an extending direction of the light guide plate 5, a first reserved expansion distance is provided between the third protrusion 51 and components opposite to the third protrusion; in the extending direction of the light guide plate 5, a second reserved expansion distance is provided between a remaining portion of an side edge of the light guide plate 5 other than the third protrusion 51 and components opposite to the remaining portion.

Figure 7:
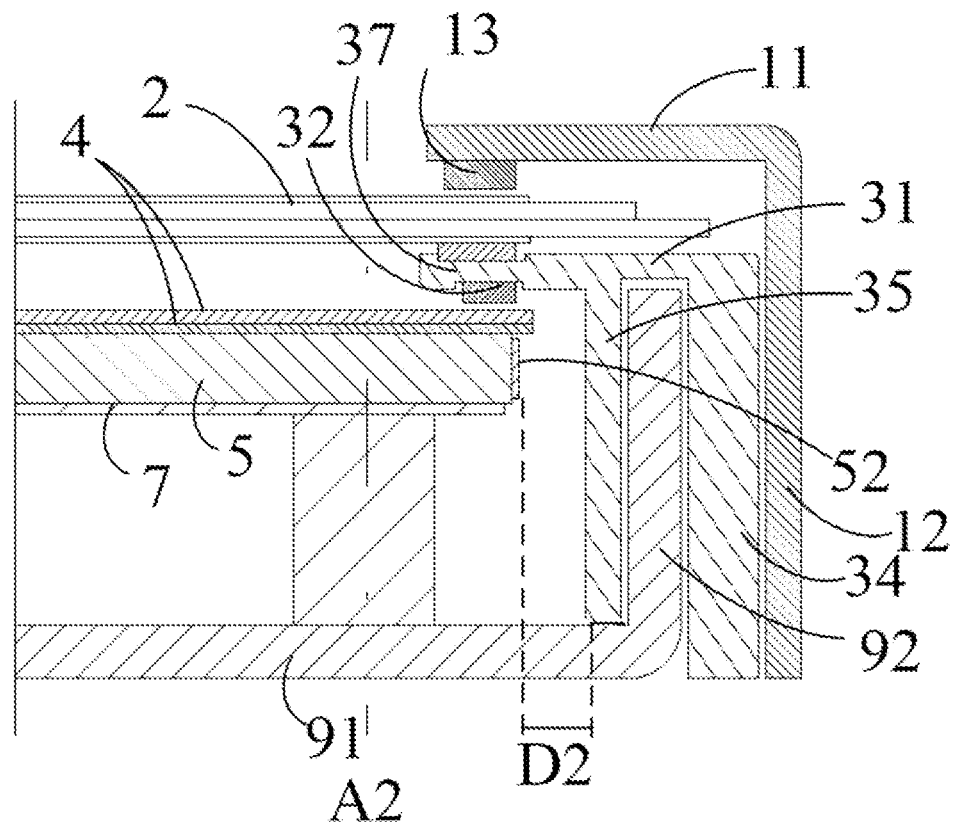
FIG. 7 is a cross-sectional view taken along a line A2 of FIG. 2.

By setting the first reserved expansion distance and the second reserved expansion distance, it may be ensured that sufficient expansion space is reserved for a side of the light guide plate 51 where the third protrusion 51 is located and a side of the remaining portion of the light guide plate 51, respectively. The first reserved expansion distance and the second reserved expansion distance are distances between the light guide plate 5 and the components opposite to the light guide plate 5 at the room temperature (e.g., 25° C.), which should be equal to or greater than the thermal expansion amounts of the light guide plate 5 in the long side direction and the short side direction, respectively. Alternatively, the first reserved expansion distance and the second reserved expansion distance may be, for example, equal to or greater than the thermal expansion amounts of the light guide plate 5 in the long side direction and the short side direction thereof at the highest operating temperature of the display module, respectively. That is, even if the display module is used at the highest operating temperature of the display module (for example, 60° C. or 80° C.), the distance between the light guide plate 5 and the component opposite thereto may still be ensured to be equal to or greater than 0. In a specific embodiment, as shown in FIGS. 1 and 7, the display module further includes a backplane 9, the backplane 9 includes a backplane body 91 located on a side of the backlight assembly away from the display panel 2, and a backplane side edge 92 surrounding the backlight assembly; moreover, the intermediate frame 3 further includes a retaining wall 35, and the retaining wall 35 and the intermediate frame side edge 34 are located on a side of the backplane body 91 close to the display panel 2 in a direction perpendicular to the light outgoing surface of the display panel 2; in a direction parallel to the light outgoing surface of the display panel 2, the retaining wall 35 is located on a side of the backplane side edge 92 close to the optical film layer 4, and the backplane side edge 92 is located between the intermediate frame side edge 34 and the retaining wall 35. A distance between the retaining wall 35 and the remaining portion of the side edge of the light guide plate 5 other than the third protrusion 51 includes the second reserved expansion distance. For example, as shown in FIG. 7, the distance D2 between the retaining wall 35 and the remaining portion of the side edge of the light guide plate 5 other than the third protrusion 51 is the second reserved expansion distance. By means of the retaining wall 35, the backplane side edge 92 may be limited together with the intermediate frame side edge 34, so that the connection stability of the backplane side edge 92 and the intermediate frame 3 may be improved, and the intermediate frame 3 is prevented from upwarping. On this basis, in order to ensure that a sufficient expansion space is reserved for the side of the light guide plate 5 where the third protrusion 51 is located while providing the retaining wall 35, an avoiding through groove (not shown in the figure) is provided on a surface of the retaining wall 35 opposite to the light guide plate 5 and at a position corresponding to the third protrusion 51. A distance D1 between the backplane side edge 92 and the third protrusion 51 at the avoiding through groove includes the first reserved expansion distance. For example, as shown in FIG. 3, the distance D1 between the backplane side edge 92 and the third protrusion 51 at the avoiding through groove is the first reserved expansion distance. In other words, the retaining wall 35 is not provided at a position of the intermediate frame body 31 corresponding to the third protrusion 51, and the retaining wall 35 is provided at other positions of the intermediate frame body 31 without the third protrusion 51. The avoiding through groove is formed by a gap between two adjacent retaining walls 35, so that the sufficient expansion space is reserved for a side of the light guide plate 51 where the third protrusion 51 is located and a side of the remaining portion of the light guide plate 51, respectively.

Similarly, the optical film layer 4 may generate thermal expansion when heated to a certain temperature, and if the expansion amount is too great, normal use of the display module may be affected. In order that a storage temperature of the display module meets the wide temperature use condition, a reserved expansion distance is provided between the first protrusion 41 of the optical film layer 4 and components opposite to the first protrusion; a reserved expansion distance is also provided between the remaining portion of the side edge of the optical film layer 4 other than the first protrusion 41 and components opposite to the remaining portion. As shown in FIG. 6A, in order to ensure that the sufficient expansion space is reserved for a side where the first protrusion 41 of the optical film layer 4 is located and a side where the remaining portion is located, respectively, a through groove 921 is provided on the backplane side edge 92 at a position corresponding to the first protrusion 41, so that when the optical film layer 4 is thermally expanded, the optical film layer 4 may extend into the through groove 921.

In some alternative embodiments, at least one support pillar 922 is disposed on a surface of the backplane side edge 92, which is away from the lateral backlight source 8, opposite to the light guide plate 5; the at least one support pillar 922 extends toward the light guide plate 5, the light guide plate 5 includes a groove 531 corresponding to the support pillar 922, and the support pillar 922 extends into the groove 531. The at least one support pillar 922 is matched with the corresponding groove 531, the light guide plate 5 may be supported, so that when the display module is used in the portrait mode, a non-uniform light incident due to a great rotation of the light guide plate 5 may be avoided, and it may ensure the display effect while the display screen with the super-long size (especially the bar screen, a length of the bar screen is more than 600 mm, for example) is compatible with the use in the landscape mode and the portrait mode.

In an embodiment, the support pillar 922 further includes a connection portion 923 embedded in the backboard side edge 92, for fixedly connecting the support pillar 922 and the backboard side edge 92 together.

In an embodiment, a surface of the light guide plate 5 at a side toward the support pillar 922 includes a fourth protrusion 53 extending in a direction parallel to a plane where the light guide plate 5 is located, and the groove 531 is disposed in the fourth protrusion 53. By providing the groove 531 in the fourth protrusion 53, a boundary of the light guide plate 5 at the groove 531 may be prevented from entering the display region, which causes a poor display such as bright lines and dark shadows at an edge of a picture.

Figure 9:
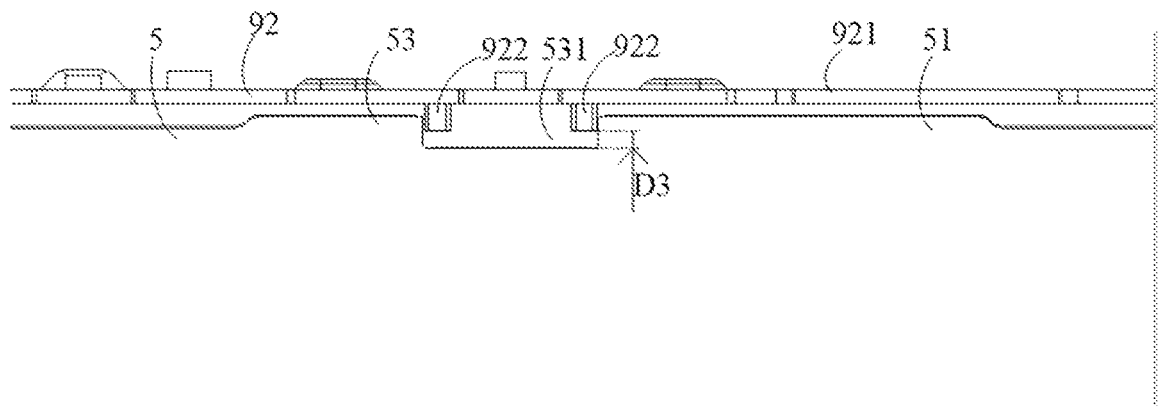
FIG. 9 is a schematic view illustrating a positional relationship between a support pillar and a light guide plate according to an embodiment of the present disclosure.

In an embodiment, as shown in FIG. 9, the third protrusion 51 and the fourth protrusion 53 may have a one-piece structure.

Figure 8:
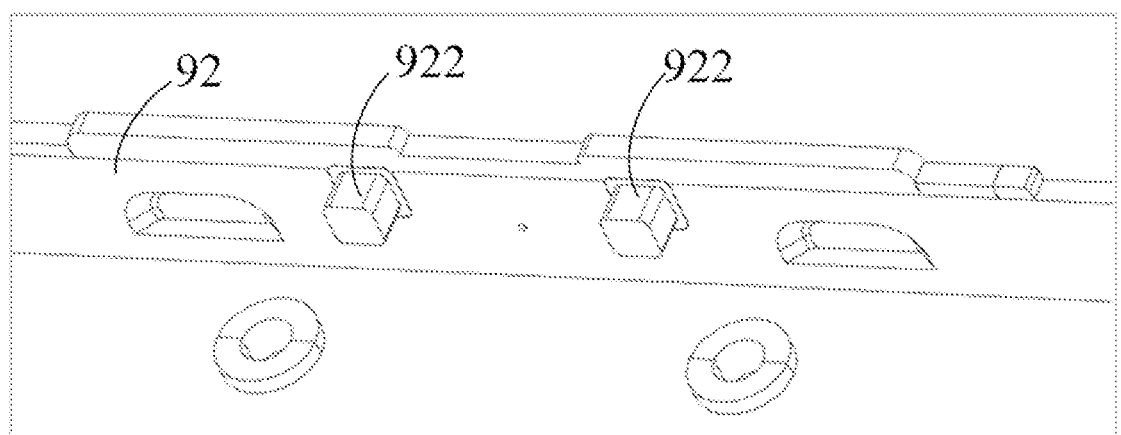
FIG. 8 is a schematic diagram of a structure of a support pillar according to an embodiment of the present disclosure.
Figure 10:
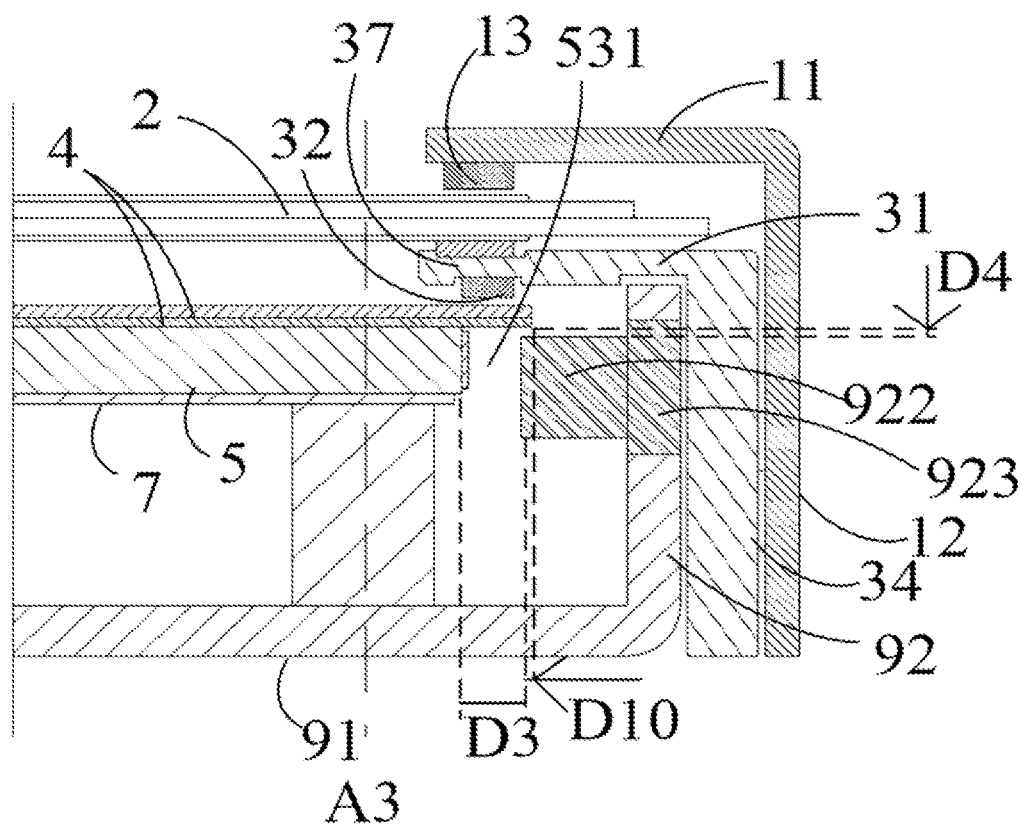
FIG. 10 is a cross-sectional view taken along a line A3 of FIG. 2.

For example, as shown in FIGS. 8 to 10, at least one support pillar 922 is disposed on a surface of the backplane side edge 92, which is away from the lateral backlight source 8, opposite to the light guide plate 5; the fourth protrusion 53 is disposed on a surface of the light guide plate 5 opposite to the at least one support pillar 922, the groove 531 is disposed on a surface of the fourth protrusion 53 opposite to the at least one support pillar 922, and the at least one support pillar 922 is disposed in the groove 531.

In some alternative embodiments, the at least one support pillar 922 includes two support pillars 922, which, for example, are located in a central partition where a symmetry plane is located, which symmetry plane is a symmetry plane of the backplane side edge 92 provided with the support pillars 922 perpendicular to the plane where the light outgoing surface of the display panel 2 is located; for example, a long side of the backplane side edge 92 is evenly divided into 3 segments, 5 segments, or 7 segments, and a middle-most segment is the central partition. In an embodiment, the at least one support pillar 922 includes two support pillars 922, which are symmetrically distributed with respect to the symmetry plane of the backplane side edge 92 provided with the support pillars 922 perpendicular to the plane where the light outgoing surface of the display panel 2 is located, and both of the two support pillars 922 are disposed near the symmetry plane. Specifically, a distance between each support pillar 922 and a center axis in the long side direction parallel to the backplane side edge 92 is, for example, 17 mm.

It will be appreciated that the backplane side edge 92 on which the support pillars 922 are disposed is symmetrically, or substantially symmetrically, with respect to the symmetry plane.

By providing two support pillars 922, the light guide plate 5 may be more effectively prevented from rotating greatly. In an embodiment, a distance between the two support pillars 922 should not be too small, so as to ensure that the light guide plate 5 is effectively prevented from rotating greatly; the distance should not be too large to prevent the light guide plate 5 from deforming at positions of the support pillars 922 when contracting at a low temperature. The distance between the two support pillars 922 is, for example, greater than or equal to 30 mm and less than or equal to 75 mm. In addition, by disposing the two support pillars 922 close to the central axis of the backplane side edge 92 parallel to the short side thereof, when the display module is used in the portrait mode, the light guide plate 5 may be supported by the support pillars 922 from a position close to the middle of the light guide plate 5 in the vertical direction, so that contraction amounts of the light guide plate 5 when contracting from the sky side and the ground side to the center are the same. When the display module is used in the portrait mode, if there is no support pillar 922, when the light guide plate 5 contracts at the low temperature, the contraction amounts in the vertical direction may be concentrated on the sky side, it needs to increase a frame width corresponding to the sky side, to ensure that there is sufficient space to accommodate a portion reserved for contracting on the sky side of the light guide plate 5 at the room temperature, thereby causing the frame width corresponding to the sky side to be greater than the other frame width. Therefore, the contraction amounts of the light guide plate 5 when contracting from the sky side and the ground side to the center are the same, a too great contraction amount on the sky side of the light guide plate 5 at a low temperature may be avoided, and the too great frame width corresponding to the sky side may be avoided. In addition, the two support pillars 922 are matched with the same groove 531, so that the number of the grooves 531 may be reduced, the processing difficulty is reduced, and the processing efficiency is improved.

In some alternative embodiments, on the basis that the display screen with the super-long size (especially the bar screen, a length of the bar screen is more than 600 mm, for example) is compatible with the use in the landscape mode and the portrait mode, for display modules of different sizes, there is a correlation between a thickness of the support pillar 922 in a direction perpendicular to the plane where the light outgoing surface of the display panel 2 is located and a thickness of the light guide plate 5. For example, the thickness of the support pillar 922 in the direction perpendicular to the plane where the light outgoing surface of the display panel 2 is located is greater than or equal to the thickness of the light guide plate 5.

In some alternative embodiments, a cross-sectional shape of the support pillar 922 in the direction perpendicular to the plane where the light outgoing surface of the display panel 2 is located and in a direction parallel to an extending direction of the backplane side edge 91 where the support pillar is located is rectangular or square, and a height of the cross-sectional shape in the direction perpendicular to the plane where the light outgoing surface of the display panel 2 is located is greater than or equal to the thickness of the light guide plate 5, for example, greater than or equal to 2 mm, so as to avoid that the light guide plate 5 is damaged due to too narrow cross-sectional shape in the height direction; a width of the cross-sectional shape in the direction parallel to the plane where the light outgoing surface of the display panel 2 is located is greater than or equal to 1.5 mm, so as to avoid insufficient support strength caused by a too small width of the cross-sectional shape. In a specific embodiment, as shown in FIG. 8, the cross-sectional shape of the support pillar 922 is, for example, a square with a side length of, for example, 3 mm; a size of the support pillar 922 protruding from the backplane side edge 92 is, for example, 3 mm; and a distance between the support pillar 922 and an axis (i.e., the axis O2 in FIG. 5) of the light guide plate 5 parallel to the short side thereof is 7 mm.

In some alternative embodiments, as shown in FIG. 9, a portion of the fourth protrusion 53 on the right support pillar 922 and the third protrusion 51 have a one-piece structure, which may limit the first protrusion 41 to prevent the first protrusion 41 from jumping off the gap between the light guide plate 5 and the intermediate frame 3, and may also support the light guide plate 5 to ensure the display effect while the display screen with the super-long size (especially the bar screen, a length of the bar screen is more than 600 mm, for example) is compatible with the use in the landscape mode and the portrait mode.

In some alternative embodiments, as shown in FIGS. 9 and 10, there is a third reserved expansion distance D3 between a surface of the support pillar 922 and a surface of the groove 531 opposite to each other in a direction perpendicular to the backplane side edge 92 away from the lateral backlight source 8 (i.e., the backplane side edge 92 where the support pillar 922 is located). The third reserved expansion distance D3 is greater than or equal to an expansion amount of the light guide plate 5 at the groove 531 at the highest operating temperature of the display module (for example, 60° C. or 80° C.). In addition, on the basis of ensuring that the third reserved expansion distance D3 is great enough, a size of the support pillar 922 protruding from the backplane side edge 92 should not be too great, so as to prevent the boundary of the light guide plate 5 at the groove 531 from entering the display region, which causes a poor display such as bright lines and dark shadows at an edge of a picture.

In a specific embodiment, the third reserved expansion distance D3 is greater than or equal to 1.8 mm; a distance between the light guide plate 5 and the backplane side edge 92 at the groove 531 is more than or equal to 4.8 mm; a distance between a surface of the support pillar 922 and a surface of the groove 531 opposite to each other in a direction parallel to the backplane side edge 92 where the support pillar 922 is located is greater than or equal to 0.2 mm; a lapping amount (i.e., an overlapping portion) of the support pillar 922 and the fourth protrusion 53 in a direction perpendicular to the backplane side edge 92 where the support pillar 922 is located is greater than or equal to 1.5 mm; a distance between the fourth protrusion 53 and the backplane side edge 92 where the support pillar 922 is located is greater than or equal to 1.3 mm.

In some alternative embodiments, as shown in FIG. 10, the support pillar 922 and the optical film layer 4 partially overlap with each other in a direction parallel to the plane where the light outgoing surface of the display panel 2 is located, that is, there is an overlapping portion between surfaces of the optical film layer 4 and the support pillar 922 close to each other, where the overlapping portion has a length D10 in a direction perpendicular to the backplane side edge 92 where the support pillar 922 is located. The support pillar 922 and the optical film layer 4 partially overlap with each other in a direction parallel to the plane where the light outgoing surface of the display panel 2 is located, the support pillar 922 may support the optical film layer 4, so as to prevent the optical film layer 4 from collapsing due to softening at a high temperature and being possibly scooped up by the support pillar 922 when expanding at a high temperature, and thus avoid the poor image quality.

In some alternative embodiments, as shown in FIG. 10, the support pillar 922 and the optical film layer 4 are spaced apart from each other in a direction perpendicular to the plane where the light outgoing surface of the display panel 2 is located, i.e., at an interval D4 in FIG. 10. The interval D4 is provided, so that a certain assemble gap may be reserved between the support pillar 922 and the optical film layer 4, which ensures the smooth mounting of the support pillar 922 and the optical film layer 4 and avoids the badness caused by the interaction force occurring therebetween.

Figure 11:
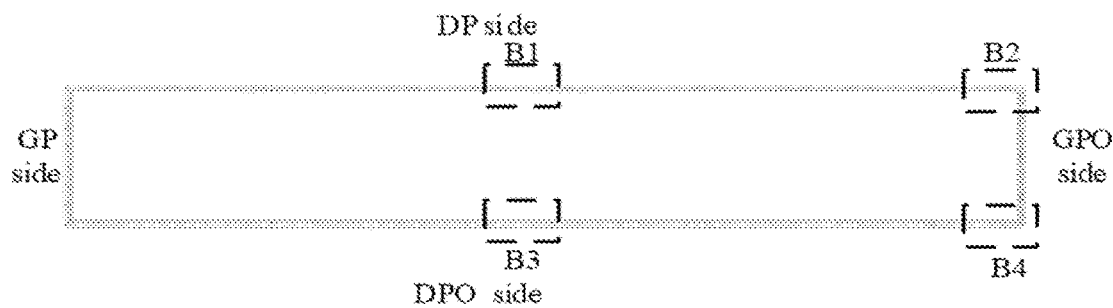
FIG. 11 is a front view of a display module placed in a landscape mode according to an embodiment of the present disclosure.
Figure 12:
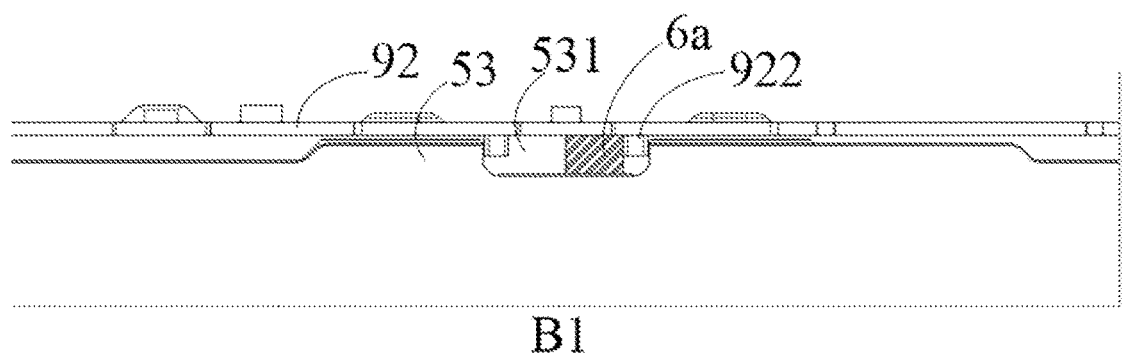
FIG. 12 is an enlarged partial view of a region B1 of FIG. 11.
Figure 13:
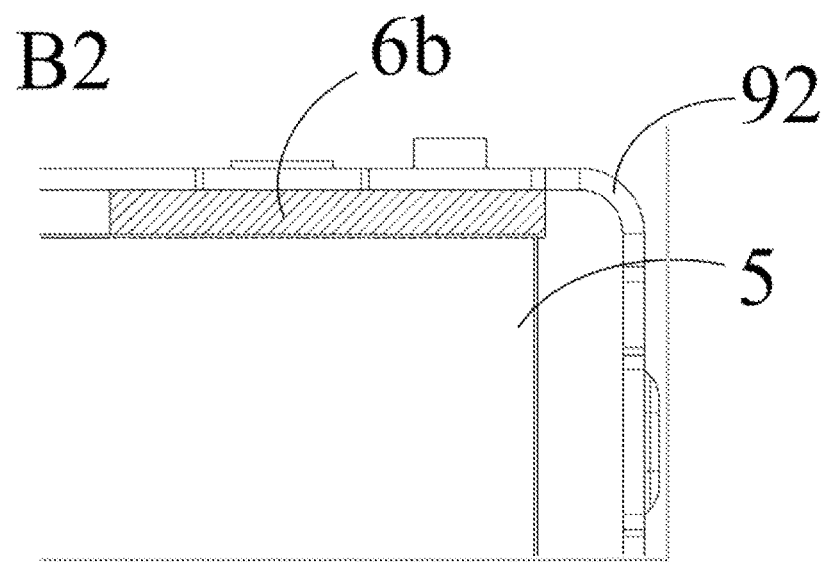
FIG. 13 is an enlarged partial view of a region B2 of FIG. 11.

In some alternative embodiments, as shown in FIGS. 11 to 13, at least one elastic support member (for example, the first elastic support member 6b shown in FIG. 1) is disposed on the surface of the backplane side edge 92, which is away from the lateral backlight source 8, opposite to the light guide plate 5, and is used for limiting the light guide plate 5. For the display screen with the super-long size (especially the bar screen, a length of the bar screen is more than 600 mm, for example), in the portrait mode, if the elastic support member is not provided, there may be a risk of the light guide plate 5 offsetting toward a side where the support pillar 922 is located, which causes an increase in a gap between the light guide plate 5 and the lateral backlight source 8, thereby causing a reduction in an efficiency of the LED incident light or even light leakage, and affecting the display effect. Thus, the at least one elastic support member is disposed on the side where the support pillar 922 is located and used for elastically supporting the light guide plate 5, so that it is ensured that the light guide plate 5 cannot offset toward a side where the support pillar 922 is located in the portrait mode, which may maintain the stability of the gap between the light guide plate 5 and the lateral backlight source 8 and ensure the display effect. In addition, in the landscape mode, the light guide plate 5 may maintain the stability of the gap between the light guide plate 5 and the lateral backlight source 8 under the action of gravity of the light guide plate 5 itself.

Alternatively, as shown in FIG. 1, the at least one elastic support member includes two first elastic support members 6b. As shown in FIG. 12, a second elastic support member 6a is located between the first elastic support members 6b and a gap is formed between the second elastic support member 6a and the light guide plate 5; as shown in FIG. 13, the two first elastic support members 6b are respectively located at positions close to edges of the long sides of the light guide plate 5 and are in a compressed state. The two first elastic support members 6b are in the compressed state, an elastic force may be always applied to edge positions of the long side of the light guide plate 5 close to two ends of the light guide plate. By means of the elastic force applied to the edge positions close to the two ends of the light guide plate 5, in the portrait mode, the light guide plate 5 may be prevented from rotating around the support pillar 922 near the middle position as a fulcrum, so that the stability of the gap between the light guide plate 5 and the lateral backlight source 8 is further maintained. Specifically, the two first elastic support members 6b are in interference fit with the light guide plate 5. For example, the two first elastic support members 6b are assembled with the light guide plate 5 with a zero gap when the compression amount reaches 0.6 mm.

In an embodiment, the at least one elastic support member includes at least one second elastic support member 6a. The second elastic support member 6a protects the limiting of the light guide plate 5 in the process of assembling, transporting and the like of the display module, particularly the display screen with the super-long size (especially the bar screen, a length of the bar screen is more than 600 mm, for example), in which process vibrations are possibly generated; and the light guide plate 5 may be prevented from bouncing to the side where the second elastic support member 6a is arranged, which causes that a distance between an LED light bar 82 on the side away from the second elastic support member 6a and the light guide plate 5 is too large, a gap between a lamp and the light guide plate is larger, thereby causing the poor display. In particular, the second elastic support member 6a is located between two first elastic support members 6b. In an embodiment, the second elastic support member 6a is located near the middle of the long side of the light guide plate 5 to effectively prevent the light guide plate 5 from bouncing.

In some embodiments, the second elastic support member 6a may not be in contact with the light guide plate 5 for preventing the bouncing. In some embodiments, the second elastic support member 6a is in contact with the light guide plate 5 without an interaction force therebetween. In some embodiments, the second elastic support member 6a is extruded by the light guide plate 5 and thus deformed, and a deformation amount of the second elastic support member 6a is smaller than that of the first elastic support member 6b.

Alternatively, as shown in FIG. 12, the number of the second elastic support members 6a is 1, and the second elastic support member 6a may be located in the groove 531, so that the second elastic support member 6a may prevent the light guide plate 5 from bouncing toward the side where the second elastic support member 6a is located, and prevent the support pillar 922 from impacting the light guide plate.

Figure 14:
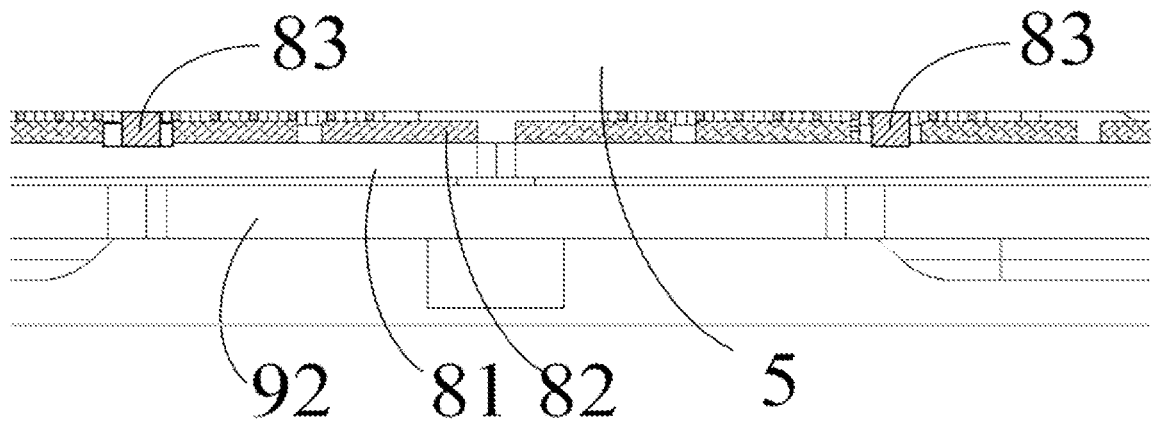
FIG. 14 is an enlarged partial view of a region B3 of FIG. 11.
Figure 15:
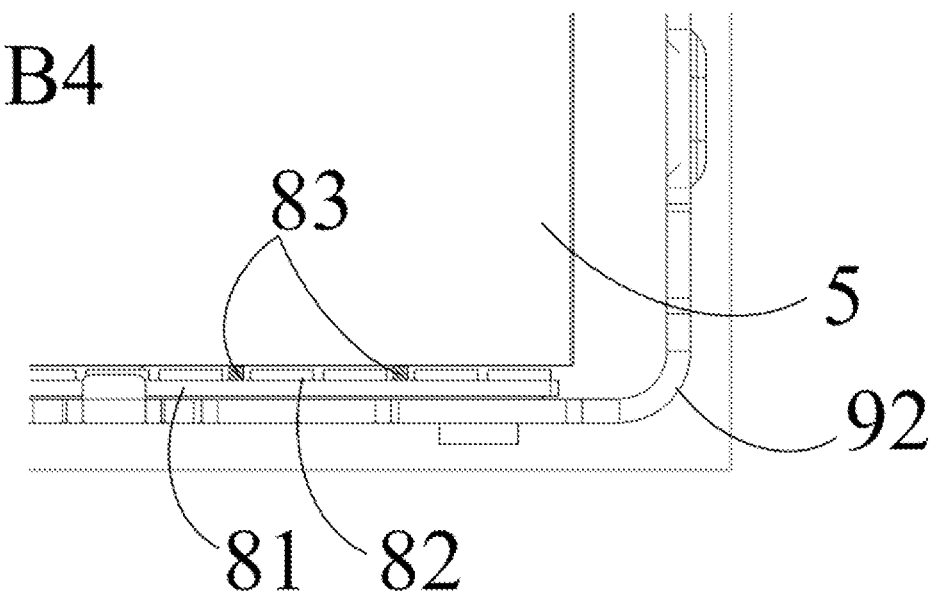
FIG. 15 is an enlarged partial view of a region B4 of FIG. 11.

In some alternative embodiments, as shown in FIGS. 14 and 15, the lateral backlight source 8 includes a first printed circuit board 81 and an LED light bar 82 disposed on the first printed circuit board 81; at least one bearing member 83 (e.g., a second bearing member 83*a* shown in FIG. 14 and a first bearing member 83*b* shown in FIG. 15) is disposed on a surface of the first printed circuit board 81 opposite to the light guide plate 5, and is configured to support the light guide plate 5 and keep the light guide plate 5 spaced apart from the LED light bar 82. In some alternative embodiments, the bearing member 83 may also be disposed on the backplane side edge of the lateral backlight source 8.

In some alternative embodiments, as shown in FIGS. 11, 14 and 15, for example, a plurality of the LED light bars 82 are included and are sequentially arranged along the long side direction of the light guide plate 5, at least one bearing member 83 may be provided corresponding to each LED light bar 82, the number of the bearing members 83 provided corresponding to each LED light bar 82 may be set according to a length of the LED light bar 82, and in an embodiment, a plurality of bearing members 83 are provided corresponding to each LED light bar 82, so that the scraping force applied by expansion or contraction of the light guide plate 5 may be dispersed, and a risk may be reduced that the LED light bar 82 is scraped by the light guide plate 5. For example, 7 bearing members 83 are provided for each LED light bar 82 (only some bearing members 83 are shown in FIGS. 14 and 15).

In some alternative embodiments, a friction coefficient of a surface of the first elastic support member 6*b* opposite to the light guide plate 5 is less than or equal to 1, and is reduced as much as possible in an embodiment, so that it is avoided that the light guide plate 5 may apply too much scraping force to the bearing members due to the elastic support member being twisted up by the light guide plate 5 at a high temperature, thereby reducing the risk that the bearing member is scraped by the light guide plate 5.

In some alternative embodiments, a protective layer (not shown) is provided on the surface of the first elastic support member 6*b* opposite to the light guide plate 5 for reducing a friction coefficient of the first elastic support member 6*b*. By reducing the friction coefficient of the elastic support member by means of the protective layer, the frictional force between the elastic support member and the light guide plate 5 may be reduced. For example, a body of the elastic support member may be made of rubber, the protective layer may be a polyethylene terephthalate tape, and a vulcanization process may be performed on the surface of the elastic support member to attach the protective layer to the elastic support member. The friction coefficient between the body of the elastic support member and the light guide plate 5 is 4, and after the protective layer is attached, the friction coefficient may be reduced to 0.5, that is, the friction coefficient may be reduced by 87.5%, so that it is avoided that the light guide plate 5 may apply too much scraping force to the bearing members due to the elastic support member being twisted up by the light guide plate 5 at a high temperature.

In some alternative embodiments, as shown in FIG. 7, a reflective layer 52 is covered on at least one side surface of the light guide plate 5 other than the light incident surface and is configured for reflecting light irradiated onto at least one side surface of the light guide plate 5 other than the light incident surface back to the inside of the light guide plate 5, so as to ensure that the image has no uneven brightness. The reflective layer 52 may be made of a material having specular reflection, such as a silver reflective sheet or a silver reflective tape.

Figure 16:
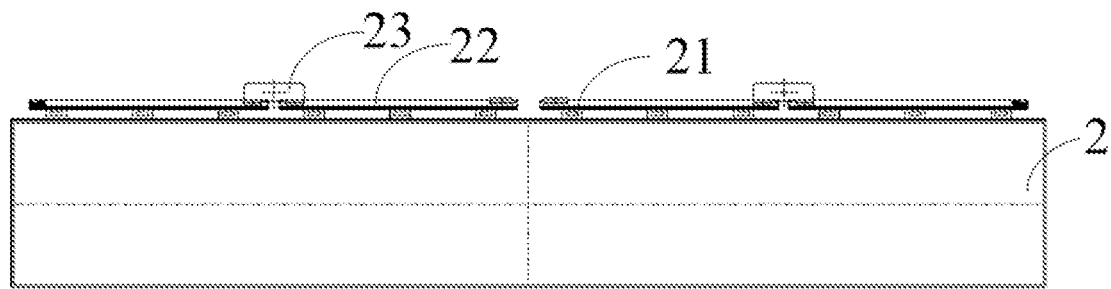
FIG. 16 is a schematic diagram of a connection among a display panel, a second printed circuit board, and a flexible circuit board according to an embodiment of the present disclosure.
Figure 17:
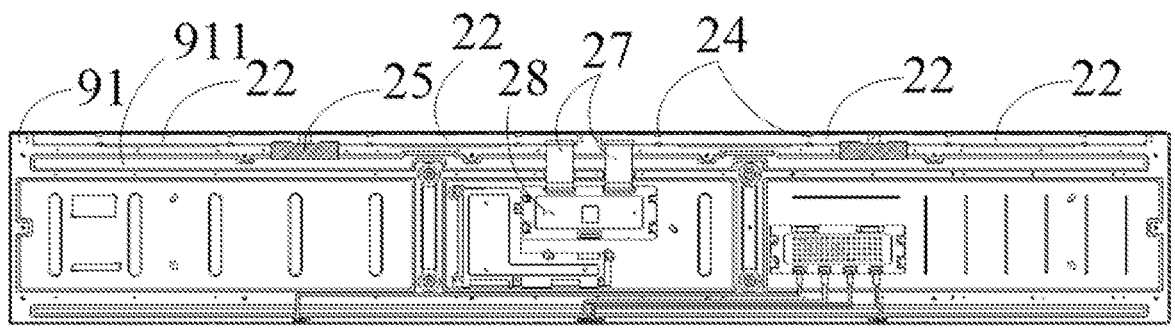
FIG. 17 is a schematic diagram of a structure of a backplane on a side away from a backlight assembly according to an embodiment of the present disclosure.

In some alternative embodiments, as shown in FIG. 16, the display module further includes at least one second printed circuit board 22, for example, 4 second printed circuit boards 22, and each second printed circuit board 22 is electrically connected to the display panel 2 through three flat cables (e.g., COF, chip on film) 21 for transmitting display signals to the display panel 2; alternatively, there may be a plurality of second printed circuit boards 22, and at least one pair of second printed circuit boards 22 in the plurality of second printed circuit boards 22 are electrically connected to each other through a flexible circuit board (FPC) 23. As shown in FIG. 17, by taking 4 second printed circuit boards 22 as an example, the 4 second printed circuit boards 22 are sequentially arranged in a direction parallel to the long side direction of the backplane body 91, wherein the leftmost second printed circuit board 22 in FIG. 17 is electrically connected to the second printed circuit board 22 adjacent to the leftmost second printed circuit board 22 through the flexible circuit board, and similarly, the rightmost second printed circuit board 22 is electrically connected to the second printed circuit board 22 adjacent to the rightmost second printed circuit board 22 through the flexible circuit board 23; further, each of the two adjacent second printed circuit boards 22 located in the middle is electrically connected to a timing controller 28 through a flexible flat cable (FFC) 27. Moreover, the flexible circuit board 23 is movably fixed on a side of the backplane body 91 away from the backlight assembly, so that the flexible circuit board 23 may be ensured to have a certain degree of freedom to move relative to the backplane body 91, and thus, in the portrait mode, the flexible circuit board may be displaced together with the second printed circuit boards 22 and the flat cables 21, so that the display effect is ensured, and further, the display screen with the super-long size (especially the bar screen, a length of the bar screen is more than 600 mm, for example) is compatible with the use in a landscape mode and a portrait mode.

Figure 18:
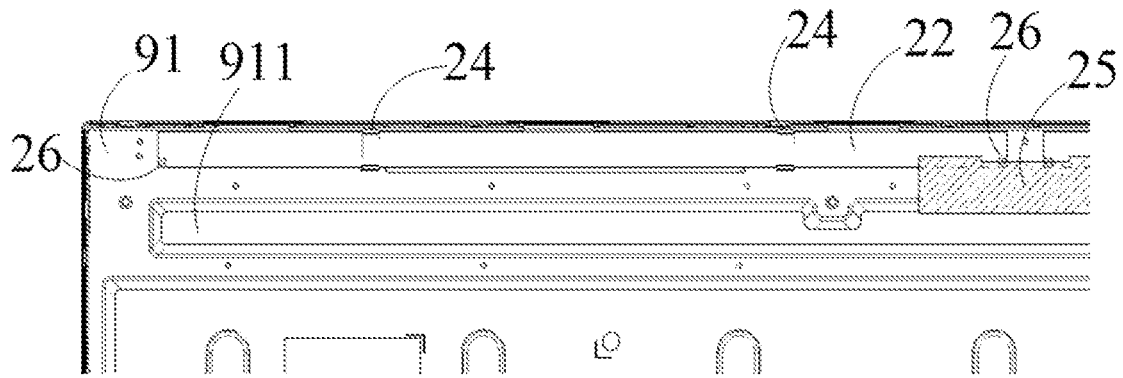
FIG. 18 is a schematic diagram of a connection between a second printed circuit board and a backplane according to an embodiment of the present disclosure.
Figure 19:
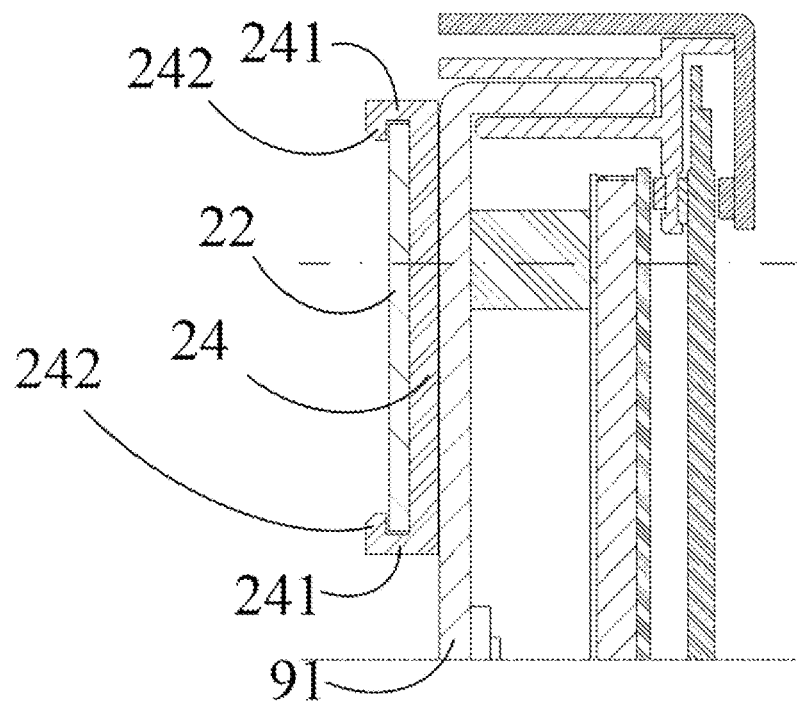
FIG. 19 is a partial cross-sectional view of a display module at an elastic mounting member according to an embodiment of the present disclosure.

As shown in FIGS. 17 to 20, at least one elastic mounting member is disposed between each second printed circuit board 22 and a surface of the backplane body 91 away from the backlight assembly, for limiting the second printed circuit board 22 on the surface of the backplane body 91 away from the backlight assembly. Specifically, as shown in FIG. 19, the elastic mounting member includes an elastic mounting member body 24 located between the backplane body 91 and the second printed circuit board 22, and two limiting bending portions 241 connected to the elastic mounting member body 24; and a main portion of each of the two limiting bending portions 241 extends in the direction away from the backplane body 91; limiting bending members 242 are respectively provided at ends of the two limiting bending portions 241 away from the elastic mounting member body 24 and opposite to each other, and the elastic mounting member body 24, the two limiting bending portions 241 and the two limiting bending members 242 are arranged to half-surround the second printed circuit board 22, so as to limit the second printed circuit board 22. Since the elastic mounting member may generate a certain elastic deformation, when the second printed circuit board 22 is installed in the space half-surrounded by the elastic mounting member body 24, the two limit bending portions 241 and the two limit bending members 242, an opening between the two limit bending members 242 may be increased in size by means of the elastic deformation, so that the second printed circuit board 22 may smoothly enter the half-surrounded space from the opening, and the second printed circuit board 22 may be installed and removed. With the help of the elastic mounting member, it may be ensured by means of the elastic characteristic of the elastic mounting member that the display module allows the second printed circuit board 22 to sink towards the grounding side by a certain distance under the action of gravity in the portrait mode, thereby realizing that the display panel 2 may be displaced together with the second printed circuit boards 22 and the flat cables 21. Comparing with a case of adopting screws or other rigid mounting modes, it may be avoided that when the display panel 2 sinks, the light leakage is caused by the flat cables 21 drawn due to the fixed second printed circuit boards 22, and then may realize that the display screen with the super-long size (especially a bar screen, a length of the bar screen is more than 600 mm, for example) is compatible with the use in the landscape mode and the portrait mode.

Figure 20:
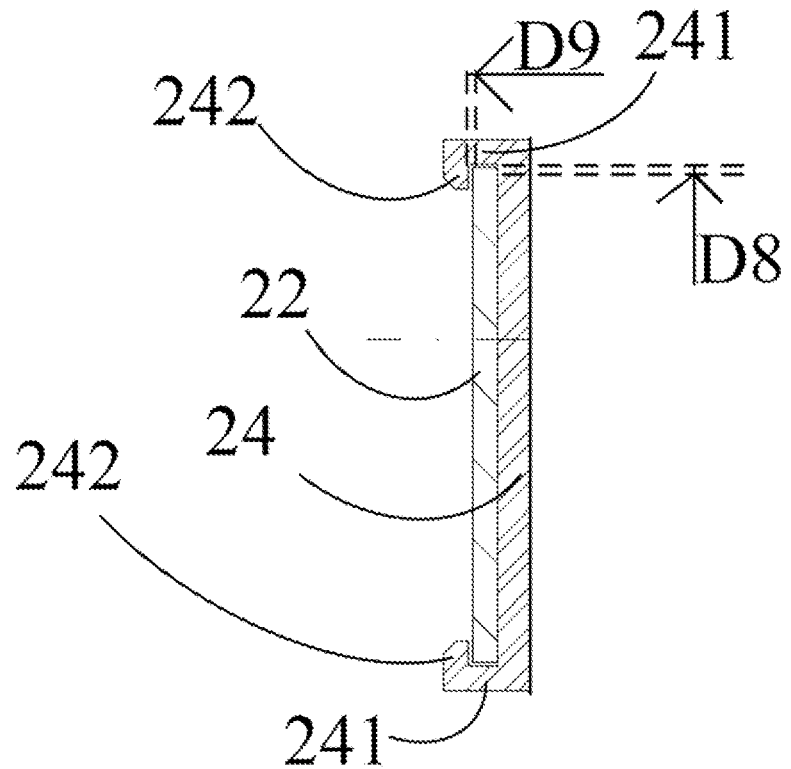
FIG. 20 is a cross-sectional view of an elastic mounting member according to an embodiment of the present disclosure.

In some alternative embodiments, as shown in FIG. 20, there is a first gap D8 between each limiting bending portion 241 and the second printed circuit board 22 in a direction perpendicular to an extending direction of the second printed circuit board 22; there is a second gap D9 between each limiting bending member 242 and the second printed circuit board 22 in the direction perpendicular to the plane where the light outgoing surface of the display panel 2 is located. The first gap D8 is, for example, 0.15 mm; the second gap D9 is, for example, 0.2 mm. By providing the first gap D8 and the second gap D9, the assembly of the second printed circuit board 22 is facilitated, and the processing accuracy of the elastic mounting members may be reduced, so that the processing cost may be reduced.

In a specific embodiment, as shown in FIG. 18, two elastic mounting members are provided corresponding to each second printed circuit board 22, each elastic mounting member is located between two adjacent flat cables 21, and a distance between the two elastic mounting members is 259 mm, but the disclosed embodiment is not limited thereto. In practical applications, the distance may be set according to the length of the second printed circuit board 22 and the number and distribution of the flat cables 21. For example, the distance is greater than or equal to one-half of a length of the second printed circuit board 22. A width of the elastic mounting member body 24 in a direction parallel to the length direction of the second printed circuit board 22 is greater than or equal to 8 mm, for example, 10 mm; a thickness of the elastic mounting member body 24 in the direction perpendicular to the plane where the light outgoing surface of the display panel 2 is located is 1.5 mm (including a thickness of an adhesive for adhering the elastic mounting member body 24 and the backplane body 91 together, for example, 0.1 mm), after the second printed circuit board 22 is assembled, a distance between a side edge of the second printed circuit board 22 close to the long side of the backplane body 1 and a surface of the frame side edge 12 opposite to the intermediate frame side edge 34 is greater than or equal to 4.4 mm, and the design of the distance and the thickness of the elastic mounting member body 24 may ensure that the flat cable 21 has a sufficient bending space at a low temperature, so that a display effect at the low temperature may be ensured.

In some alternative embodiments, as shown in FIG. 18, a side of the second printed circuit board 22 close to the backplane body 91 includes at least one grounding region, and an conductive flexible member 26 is disposed between the grounding region and a surface of the backplane body 91 away from the backlight assembly for electrically connecting the grounding region and the backplane body 91 together, and the conductive flexible member 26 is adhesively connected to the grounding region and the backplane body 91, respectively. The backplane body 91 has a grounding terminal (e.g. located on one of the short sides), and the second printed circuit board 22 may be grounded through the backplane body 91 by means of the conductive flexible member 26. The conductive flexible member 26 is, for example, conductive foam; and the number of the conductive flexible members 26 is the same as the number of conductive regions (e.g., copper exposed regions) on the second printed circuit board 22; and the conductive flexible members are disposed in a one-to-one correspondence with the conductive regions. The conductive flexible members 26 are located between the second printed circuit board 22 and the backplane body 91 and in elastic contact with the second printed circuit board 22 and the backplane body 91 respectively, so that the second printed circuit board 22 and the backplane body 91 may be always kept in effective and good grounding, and the reliability of the electrical characteristics of the display module may be improved; and the conductive flexible members 26 may allow the second printed circuit board 22 to displace relatively less with respect to the backplane body 91 in the portrait mode, so as to ensure that the second printed circuit board 22 and the backplane body 91 may be kept in effective and good grounding in the portrait mode.

In a specific embodiment, as shown in FIG. 18, two conductive flexible members 26 are provided corresponding to each second printed circuit board 22, for example, located in the grounding regions at two corners of the second printed circuit board 22 away from the long side of the backplane body 21, each conductive flexible member 26 is, for example, a square with a side length of 5 mm; a thickness of each conductive flexible member 26 in the direction perpendicular to the plane where the light outgoing surface of the display panel 2 is located is 2 mm, and the maximum compression ratio (a ratio of a maximum compression amount to an original thickness) that may be achieved by the conductive flexible member is, for example, 50%. However, an embodiment of the present disclosure is not limited to this. In actual applications, such sizes may be adjusted according to the thickness of each conductive flexible member 26 and an area of each grounding region.

Figure 21:
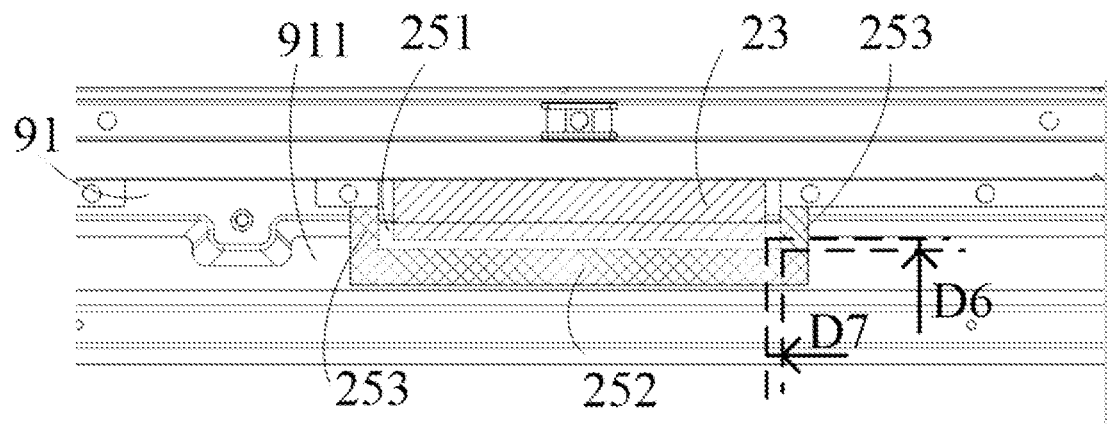
FIG. 21 is a schematic diagram of a structure of a securing tape according to an embodiment of the present disclosure.

In some alternative embodiments, as shown in FIGS. 18 and 21, a fixing tape 25 is disposed on a surface of the backplane body 91 away from the backlight assembly at a position corresponding to the flexible circuit board 23, the fixing tape 25 includes an adhesive-free portion 251, a first adhesive portion 252 and two second adhesive portions 253, wherein at least a portion of the flexible circuit board 23 is located between the backplane body 91 and the adhesive-free portion 251; the first adhesive portion 252 and the two second adhesive portions 253 are respectively positioned on three sides of the adhesive-free portion 251 and are connected to the adhesive-free portion 251 to form a one-piece structure; the two second adhesive portions 253 are respectively positioned at two sides of the adhesive-free portion 251; for example, the first adhesive portion 252 is adhered to the surface of the backplane body 91 away from the backlight assembly; a first avoiding gap D6 is formed between the first adhesive portion 252 and the flexible circuit board 23; for example, two second adhesive portions 253 are adhered to the surface of the backplane body 91 away from the backlight assembly; a second avoiding gap D7 is provided between each second adhesive portion 253 and the flexible circuit board 23. For example, an orthographic projection of the backplane body 91 on a plane parallel to the plane where the light outgoing surface of the display panel 2 is located is rectangular, the second printed circuit board 22 is strip-shaped and extends along a long side direction of the rectangle of the backplane body 91, the first adhesive portion 252 is located on a side of the adhesive-free portion 251 away from the long side of the rectangle of the backplane body 91 and extends along a direction parallel to the long side direction of the rectangle of the backplane body 91, and the first avoiding gap D6 is arranged between the first adhesive portion 252 and the flexible circuit board 23 in a direction perpendicular to the long side direction of the rectangle of the backplane body 91; the two second adhesive portions 253 are oppositely arranged on two sides of the flexible circuit board 23 in the direction parallel to the long side of the rectangle of the backplane body 91, and the second avoiding gap D7 is arranged between each second adhesive portion 253 and the flexible circuit board 23 in the direction parallel to the long side of the rectangle of the backplane body 91. The first avoiding gap D6 and the second avoiding gap D7 each are 5 mm, for example.

The flexible circuit board 23 is protected by the fixing tape 25, so that the flexible circuit board 23 may be prevented from being scratched and damaged, and the flexible circuit board 23 may be ensured through the first avoiding gap D6 and the second avoiding gap D7 to have enough freedom degree in a two-dimensional plane parallel to the plane where the backplane body 91 is located, that is, the flexible circuit board 23 may be movably fixed on the side of the backplane body 91 away from the backlight assembly, so that the flexible circuit board 23 may be displaced together with the second printed circuit boards 22 and the flat cables 21 in the portrait mode, and the display effect is ensured, and further, the display screen with the super-long size (especially a bar screen, a length of the bar screen is more than 600 mm, for example) is compatible with the use in the landscape mode and the portrait mode.

In some alternative embodiments, the second avoiding gap D7 is greater than or equal to a sum of the sinking displacement amount of the display panel 2 and the contraction amounts of the backplane 9 at the lowest operating temperature (for example, −20° ° C. or −30° C.) of the display module in the portrait mode, so as to ensure that the flexible circuit board 23 has enough movement space at the low temperature. The first avoiding gap D6 is greater than or equal to the contraction amounts of the backplane 9 in the direction parallel to the short side of the backplane 9 at the lowest operating temperature (for example, −20° C. or −30° C.) of the display module.

In some alternative embodiments, as shown in FIG. 21, a surface profile of the backplane body 91 parallel to the light outgoing surface of the display panel 2 is rectangular; the second printed circuit board 22 is strip-shaped and extends along the long side of the rectangle; a reinforcing rib 911 is provided on a surface of the backplane body 91 away from the backlight assembly, and located on a side of the second printed circuit board 22 away from a long edge of the backplane body 9, and is recessed towards a direction close to the display panel 2 and extends along the direction parallel to the long edge of the backplane body 91 for enhancing the strength of the backplane 9 and avoiding the backplane from bending and deforming. On this basis, a part of an orthographic projection of each flexible circuit board 23 on the backplane body 91 may be located in the recessed portion of the reinforcing rib 911, and the part of the flexible circuit board 23 is located between the backplane body 91 and the adhesive-free portion 251; the first adhesive portion 252 are adhered on the bottom surface of the recessed portion, and at least parts of the two second adhesive portions 253 are also positioned in the recessed portion of the reinforcing rib 911 and adhered on the side surface and/or the bottom surface of the recessed portion; the portion of the flexible circuit board 23 with the orthographic projection on the backplane body 91 located in the recessed portion of the reinforcing rib 911, may be pressed into the recessed portion by the adhesive-free portion 251 to cover and fix each flexible circuit board 23.

In a specific embodiment, a length×width of a lapping region of the adhesive-free portion 251 and each flexible circuit board 23 is equal to 125 mm×15 mm, and a length× width of the fixing tape 25 is equal to 155 mm×30 mm. A width of each of the first adhesive portion 252 and the two second adhesive portions 253 is greater than or equal to 8 mm, to ensure an enough attaching strength with the backplane body 91.

Figure 22:
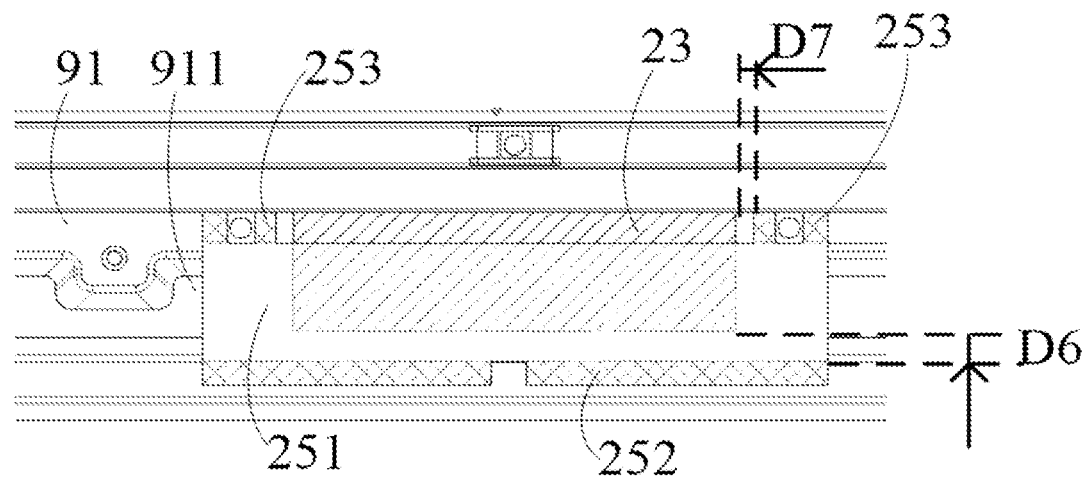
FIG. 22 is a schematic diagram of another structure of a securing tape according to an embodiment of the present disclosure.

In other alternative embodiments, as shown in FIG. 22, the adhesive-free portion 251 spans the recessed portion of the reinforcing rib 911, but is not disposed in the recessed portion of the reinforcing rib 911; the first adhesive portion 252 is positioned on a side of the recessed portion of the reinforcing rib 911 away from the long side of the backboard body 91; the two second adhesive portions 253 are located on a side of the recessed portion of the reinforcing rib 911 close to the long side of the backplane body 91. The orthographic projections of the first adhesive portion 252 and the two second adhesive portions 253 on the backplane body 91 are not arranged in the recessed portion of the reinforcing rib 911. Because the adhesive-free portion 251 only spans the recessed portion of the reinforcing rib 911, the moving space of each flexible circuit board 23 may be larger on the basis of protecting the flexible circuit board 23, so that each flexible circuit board 23 is not bent by any external force and is always in an extended state, thereby preventing the flexible circuit board 23 from being scratched and damaged in the processes of assembling and carrying, and ensuring that the second printed circuit board 22 has more freedom of displacement, so that the scheme for fixing the flexible circuit boards 23 shown in FIG. 22 is more suitable for the display screen with the super-long size (especially the bar screen, a length of the bar screen is more than 600 mm, for example) compatible with the use in the landscape mode and the portrait mode, especially at the lowest operating temperature (such as −20° C. or −30° C.) of the display module. The hardness of each flexible circuit board 23 and the fixing adhesive tape 25 is increased with respect to the room temperature (such as 25° C.), so that the restriction of each flexible circuit board 23 by the fixing tape 25 may be increased, and each flexible circuit board 23 cannot be displaced along with the second printed circuit boards 22 and the flat cables 21, thereby affecting the display effect. The scheme for fixing the flexible circuit boards 23 shown in FIG. 22 may well solve this problem by ensuring more degrees of freedom of displacement of the second printed circuit board 22.

In a particular embodiment, as shown in FIG. 22, the fixing tape 25 has a length×width of 177 mm×52 mm; a lapping region of the adhesive-free portion 251 and each flexible circuit board 23 has a length×width of 125 mm×20 mm, and a width of each of the first adhesive portion 252 and the two second adhesive portions 253 is greater than or equal to 8 mm, to ensure an enough attaching strength with the backplane body 91.

In some alternative embodiments, the fixing tape 25 includes the adhesive-free portion 251 and may include only the first adhesive portion 252, or the fixing tape 25 includes the adhesive-free portion 251 and includes only the two second adhesive portions 253, as long as the limitation of each flexible circuit board 23 is achieved.

In some alternative embodiments, the display module provided in the embodiments of the present disclosure is suitable for an ultra-long display screen (especially a bar screen with a length of more than 600 mm, such as a length of 2 m). For example, the display region of the display panel 2 has the diagonal size greater than or equal to 47.1 inches, and the length-width ratio greater than or equal to 3.2. Specifically, for example, the diagonal size of the display region of the display panel 2 is equal to 48 inches, and the length-width ratio of the display region of the display panel 2 is equal to 3.2; for example, the diagonal size of the display region of the display panel 2 is equal to 47.1 inches, and the length-width ratio of the display region of the display panel 2 is equal to 24.

As another technical solution, an embodiment of the present disclosure further provides a display apparatus, which includes the display module provided in the embodiment of the present disclosure, where the display module is a bar display module, that is, a length-width ratio of a display region is greater than 1. For example, the length-width ratio of the display region of the display panel 2 is greater than or equal to 16:5.

In the display apparatus provided by the embodiment of the present disclosure, by adopting the display module provided by the embodiment of the present disclosure, it may ensure that the misalignment problem does not appear in the optical film layer and satisfy a narrow frame requirement while a display screen with a super-long size (especially a bar screen, a length of the bar screen is more than 600 mm, for example) is compatible with the use in a landscape mode and a portrait mode.

The display apparatus provided by the embodiment of the present disclosure may be applied to the intelligent transportation system field such as public transportation, subway, etc., for example, may be applied to a display for a shield gate in the subway and a display for a semi-outdoor station board, so as to facilitate the passenger to watch information such as stations of the subway, and improve the passenger riding experience. In addition, the display apparatus may also be applied to advertisement serving display in subway, public transportation or the like.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A display module, comprising a display panel and a backlight assembly on a side away from a light outgoing surface of the display panel, wherein the backlight assembly comprises a light source assembly and an optical film layer, and light emitted by the light source assembly enters the display panel through the optical film layer;
   through grooves are on at least one long side and at least one short side of the optical film layer and penetrate through the optical film in a direction perpendicular to a plane where the light outgoing surface of the display panel is located; and
   the display module further comprises an intermediate frame, wherein the intermediate frame comprises an intermediate frame body surrounding the backlight assembly and a first extension between the display panel and the optical film layer; the intermediate frame further comprises second protrusions on a surface opposite to the through grooves, and correspondingly in the through grooves.

2. The display module according to claim 1, wherein a plurality of through grooves are on the at least one long side of the optical film layer, and a middlemost through groove of all the through grooves on the at least one long side of the optical film layer is offset from a symmetry plane of the optical film layer parallel to the at least one short side of the optical film layer and perpendicular to the plane where the light outgoing surface of the display panel is located; the remaining through grooves are symmetrically distributed with respect to the symmetry plane of the optical film layer parallel to the at least one short side of the optical film layer and perpendicular to the plane where the light outgoing surface of the display panel is located; and
   a plurality of through grooves are on the at least one short edge of the optical film layers, and are symmetrically distributed with respect to a symmetry plane of the optical film layer parallel to the at least one long side of the optical film layer and perpendicular to the plane where the light outgoing surface of the display panel is located.

3. The display module according to claim 1, wherein first protrusions are provided on the at least one long side and the at least one short side of the optical film layer; each of the first protrusions extends toward an outside of an edge of the optical film layer along a direction parallel to a plane where a light incident surface of the optical film layer is located; each of the through grooves is at a position away from a farthest end of a corresponding first protrusion, and the farthest end is a farthest end of the corresponding first protrusion extending toward the outside of the edge of the optical film layer.

4. The display module according to claim 3, wherein any two adjacent first protrusions on the at least one long side of the optical film layer have a first distance therebetween, and the first protrusion closest to the at least one short side of the optical film layer and the at least one short side of the optical film layer has a second distance therebetween; and the first distance is greater than or equal to 160 mm and less than or equal to 300 mm; the second distance is greater than or equal to 50 mm and less than or equal to 150 mm; and/or
   wherein any two adjacent first protrusions on the at least one short side of the optical film layer have a third distance therebetween, and the first protrusion closest to the at least one long side of the optical film layer and the at least one long side of the optical film layer has a fourth distance therebetween, and the third distance is greater than or equal to 50 mm and less than or equal to 150 mm; the fourth distance is greater than or equal to 30 mm and less than or equal to 70 mm.

5. The display module according to claim 3, wherein the light source assembly further comprises a light guide plate and a reflective sheet, which are on a side of the optical film layer away from the display panel, and sequentially arranged along a direction away from the optical film layer; the light source assembly further comprises a lateral backlight source opposite to the light guide plate; and
   a third protrusion is at a position of the light guide plate corresponding to the first protrusion on the at least one long side and/or the at least one short side of the optical film layer, and an orthographic projection of the third protrusion on a plane parallel to the plane where the light outgoing surface of the display panel is located partially overlaps an orthographic projection of the first protrusion on the plane parallel to the plane where the light outgoing surface of the display panel is located.

6. The display module according to claim 5, wherein an overlapping area of the orthographic projection of the third protrusion on the plane where the light outgoing surface of the display panel is located and an orthographic projection of the through groove on the plane where the light outgoing surface of the display panel is located, is greater than or equal to one half of, an area of the orthographic projection of the through groove on the plane where the light outgoing surface is located.

7. The display module according to claim 5, wherein a first reserved expansion distance is between the third protrusion and a component opposite to the third protrusion in an extending direction of the light guide plate; a second reserved expansion distance is between a remaining portion of an side edge of the light guide plate other than the third protrusion and a component opposite to the remaining portion in an extending direction of the light guide plate.

8. The display module according to claim 6, wherein the display module further comprises a backplane, the backplane comprises a backplane body on a side of the backlight assembly away from the display panel, and a backplane side edge surrounding the backlight assembly;
the intermediate frame further comprises an intermediate frame side edge and a retaining wall on a side of the backplane body close to the display panel in a direction perpendicular to the light outgoing surface of the display panel; in a direction parallel to the light outgoing surface of the display panel, the retaining wall is on a side of the backplane side edge close to the optical film layer, and the backplane side edge is between the intermediate frame side edge and the retaining wall;
a distance between the retaining wall and the remaining portion of the side edge of the light guide plate other than the third protrusion comprises the second reserved expansion distance; and
an avoiding through groove is on a surface of the retaining wall opposite to the light guide plate and at a position corresponding to the third protrusion; a distance between the backplane side edge and the third protrusion at the avoiding through groove comprises the first reserved expansion distance.

9. The display module according to claim 1, wherein the light source assembly further comprises a light guide plate and a reflective sheet, which are on a side of the optical film layer away from the display panel, and sequentially arranged along a direction away from the optical film layer; the light source assembly further comprises a lateral backlight source opposite to the light guide plate;
the through grooves are only on one long edge and one short edge of the optical film layer;
no through groove is on the other long edge of the optical film layer corresponding to the lateral backlight source; and
an outline of a display region of the display panel is rectangular.

10. The display module according to claim 1, wherein the display module further comprises a backplane, the backplane comprises a backplane body on a side of the backlight assembly away from the display panel, and a backplane side edge surrounding the backlight assembly; the light source assembly further comprises a light guide plate and a reflective sheet, which are on a side of the optical film layer away from the display panel, and sequentially arranged along a direction away from the optical film layer; the light source assembly further comprises a lateral backlight source opposite to the light guide plate; wherein
at least one support pillar is on a surface of the backplane side edge, which is away from the lateral backlight source, opposite to the light guide plate; the at least one support pillar extends toward the light guide plate, the light guide plate comprises at least one groove corresponding to the at least one support pillar, and each of the at least one support pillar extends into a corresponding groove of the at least one groove; and
a surface of the light guide plate toward the at least one support pillar comprises a fourth protrusion extending in a direction parallel to a plane where the light guide plate is located, and the at least one groove is on the fourth protrusion.

11. The display module according to claim 10, wherein the at least one support pillar comprises two support pillars symmetrically distributed with respect to a symmetry plane, of the backplane side edge with the two support pillars, perpendicular to the plane where the light outgoing surface of the display panel is located.

12. The display module according to claim 10, wherein the at least one support pillar and the optical film layer partially overlap with each other in a direction parallel to the plane where the light outgoing surface of the display panel is located; the at least one support pillar and the optical film layer are spaced apart from each other in a direction perpendicular to the plane where the light outgoing surface of the display panel is located.

13. The display module according to claim 10, wherein at least one elastic support member is on a surface of the backplane side edge, which is away from the lateral backlight source, opposite to the light guide plate, and is used for supporting the light guide plate; and
the lateral backlight source comprises a first printed circuit board and an LED light bar arranged on the first printed circuit board; and at least one bearing member is on a surface of the first printed circuit board opposite to the light guide plate and for supporting the light guide plate,
wherein the at least one elastic support member comprises two first elastic support members and one second elastic support member, wherein the two first elastic support members are in a compressed state, and a gap exists between the second elastic support member and the light guide plate; and
the two first elastic support members are close to two edge positions of a long edge of the light guide plate, respectively; and the second elastic support member is between the two first elastic support members, and
wherein a protective layer is on a surface of the first elastic support member opposite to the light guide plate and for reducing a friction coefficient of a main material of the first elastic support member.

14. The display module according to claim 1, wherein the display module further comprises a backplane, the backplane comprises a backplane body on a side of the backlight assembly away from the display panel, the display module further comprises at least one second printed circuit board electrically connected to the display panel and for transmitting display signals to the display panel, wherein,
at least one elastic mounting member is between each of the at least one second printed circuit board and a surface of the backplane body away from the backlight assembly and for limiting the second printed circuit board on the surface of the backplane body away from the backlight assembly; and each of the at least one elastic mounting member comprises an elastic mounting member body between the backplane body and one of the at least one second printed circuit board, and two limiting bending portions connected to the elastic mounting member body; and a main portion of each of the two limiting bending portions extends in a direction away from the backplane body; limiting bending members are respectively at ends of the two limiting bending portions away from the elastic mounting member body and opposite to each other, and the elastic mounting member body, the two limiting bending portions and the two limiting bending members are arranged to half-surround the second printed circuit board, so as to limit the second printed circuit board.

15. The display module according to claim 14, wherein a first gap is between each of the two limiting bending portions and the second printed circuit board in a direction perpendicular to an extending direction of the second printed circuit board; a second gap is between each of the two limiting bending members and the second printed circuit board in the direction perpendicular to the plane where the light outgoing surface of the display panel is located;
    a side of the second printed circuit board close to the backplane body comprises at least one grounding region, and an conductive flexible member is between the at least one grounding region and a surface of the backplane body away from the backlight assembly and for electrically connecting the at least one grounding region and the backplane body together, and
    the conductive flexible member is adhesively connected to the at least one grounding region and the backplane body.

16. The display module according to claim 14, wherein the at least one second printed circuit board comprises a plurality of second printed circuit boards, at least one pair of the plurality of second printed circuit boards is electrically connected to each other through a flexible circuit board, which is movably fixed to a side of the backplane body away from the backlight assembly.

17. The display module according to claim 16, wherein a fixing tape is on the surface of the backplane body away from the backlight assembly at a position corresponding to the flexible circuit board, and comprises an adhesive-free portion, a first adhesive portion and two second adhesive portions, wherein
    at least a portion of the flexible circuit board is between the backplane body and the adhesive-free portion;
    the first adhesive portion and the two second adhesive portions are respectively on three sides of the adhesive-free portion and are connected to the adhesive-free portion to form a one-piece structure; the two second adhesive portions are respectively at two sides of the adhesive-free portion; and
    a first avoiding gap is between the first adhesive portion and the flexible circuit board; a second avoiding gap is between each of the two second adhesive portions and the flexible circuit board.

18. The display module according to claim 17, wherein a surface profile of the backplane body parallel to the light outgoing surface of the display panel is rectangular; each of the at least one second printed circuit board is strip-shaped and extends along a long side of the rectangle; wherein
    a reinforcing rib is on a surface of the backplane body away from the backlight assembly and on a side of the second printed circuit board away from a long edge of the backplane body, and is recessed towards a direction close to the display panel and extends along a direction parallel to the long edge of the backplane body; a part of an orthographic projection of the flexible circuit board on the backplane body is in a recessed portion of the reinforcing rib,
    at least one part of the flexible circuit board is between the backplane body and the adhesive-free portion; and
    the first adhesive portion is on a side of the recessed portion of the reinforcing rib away from the long side of the backboard body; the two second adhesive portions are on a side of the recessed portion of the reinforcing rib close to the long side of the backplane body.

19. The display module according to claim 1, wherein a display region of the display panel has a diagonal size of greater than or equal to 47.1 inches and a length-width ratio of greater than or equal to 3.2.

20. A display apparatus, comprising the display module according to claim 1, wherein the display module is a bar display module.

* * * * *